(12) United States Patent
Specter et al.

(10) Patent No.: US 12,395,707 B2
(45) Date of Patent: Aug. 19, 2025

(54) APPARATUS AND METHOD FOR GENERATING A DYNAMICALLY SELF-MODIFYING GRAPHICAL INTERFACE

(71) Applicant: CGIP HOLDCO, LLC, Stamford, CT (US)

(72) Inventors: Jeffrey Specter, New York, NY (US); Alex Gounis, Stamford, CT (US)

(73) Assignee: CGIP HOLDCO, LLC, Stamford, CT (US)

( * ) Notice: Subject to any disclaimer, the term of this patent is extended or adjusted under 35 U.S.C. 154(b) by 0 days.

(21) Appl. No.: 18/884,666

(22) Filed: Sep. 13, 2024

(65) Prior Publication Data

US 2025/0088716 A1    Mar. 13, 2025

Related U.S. Application Data

(60) Provisional application No. 63/538,176, filed on Sep. 13, 2023.

(51) Int. Cl.
| | | |
|---|---|---|
| H04N 21/485 | (2011.01) | |
| G06F 8/35 | (2018.01) | |
| G06F 8/38 | (2018.01) | |
| H04N 21/466 | (2011.01) | |
| H04N 21/854 | (2011.01) | |
| G06F 3/048 | (2013.01) | |
| G06F 3/0484 | (2022.01) | |

(52) U.S. Cl.
CPC .......... *H04N 21/4858* (2013.01); *G06F 8/35* (2013.01); *G06F 8/38* (2013.01); *H04N 21/4666* (2013.01); *H04N 21/854* (2013.01); *G06F 3/048* (2013.01); *G06F 3/0484* (2013.01)

(58) Field of Classification Search
None
See application file for complete search history.

(56) References Cited

U.S. PATENT DOCUMENTS

| | | | | |
|---|---|---|---|---|
| 2010/0114864 A1* | 5/2010 | Agam | ................... | G06F 16/951 |
| | | | | 707/706 |
| 2019/0205746 A1* | 7/2019 | Nurvitadhi | ............. | G06N 3/084 |
| 2020/0021873 A1* | 1/2020 | Swaminathan | ...... | H04N 21/466 |
| 2021/0027759 A1* | 1/2021 | Ogawa | ................... | G10L 13/02 |
| 2021/0232948 A1* | 7/2021 | Otsuka | ................... | G06N 3/047 |

* cited by examiner

*Primary Examiner* — Tuan S Nguyen
(74) *Attorney, Agent, or Firm* — Caldwell Intellectual Property Law

(57) ABSTRACT

The CodeADX site builder offers an intuitive and user-friendly platform for creating visually stunning websites effortlessly, from content feeds, and also uses those content feeds, coupled with AI to create descriptive posts about the content found in the various content feeds.

20 Claims, 19 Drawing Sheets

APPARATUS AND METHOD FOR GENERATING A DYNAMICALLY SELF-MODIFYING GRAPHICAL INTERFACE

CROSS-REFERENCE TO RELATED APPLICATIONS

This application claims the benefit of priority of U.S. Provisional Patent Application Ser. No. 63/538,176, filed on Sep. 13, 2023, and titled "AI-POWERED SITE BUILDER FOR SIMPLE AND DYNAMIC CONTENT MANAGEMENT," which is incorporated by reference herein in its entirety.

FIELD OF THE INVENTION

The present invention generally relates to the field of network-based graphical use interfaces. In particular, the present invention is directed to an apparatus and method for generating a dynamically self-modifying graphical interface.

BACKGROUND

Traditional website creation and content management often involve complex processes, requiring technical skills and time-consuming tasks.

SUMMARY OF THE DISCLOSURE

In an aspect, an apparatus for generating a dynamically self-modifying graphical interface includes at least a processor and a memory communicatively connected to the at least a processor, the memory containing instructions configuring the at least a processor to configure a display device to generate a display window, receive a plurality of streaming quanta and a feed description dataset associated with the plurality of streaming quanta, generate a graphical output element and a non-display metadata element as a function of the feed description dataset, wherein generating the graphical output element and the non-display metadata element further comprises generating the graphical output element and the non-display metadata element using the feed description dataset and a generative neural network trained to input feed description dataset and output graphical elements and non-display metadata elements, and configure the display device to display, in a field of the display window, the graphical output element, embed, in the display window, the non-display metadata element, and output the plurality of streaming quanta.

In another aspect, method of generating a dynamically self-modifying graphical interface includes configuring, by at least a processor, a display device to generate a display window, receiving, by the at least a processor, a plurality of streaming quanta and a feed description dataset associated with the plurality of streaming quanta, generating, by the at least a processor, a graphical output element and a non-display metadata element as a function of the feed description dataset, wherein generating the graphical output element and the non-display metadata element further comprises generating the graphical output element and the non-display metadata element using the feed description dataset and a generative neural network trained to input feed description dataset and output graphical elements and non-display metadata elements, and configuring, by the at least a processor, the display device to display, in a field of the display window, the graphical output element, embed, in the display window, the non-display metadata element, and output the plurality of streaming quanta.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

The present invention relates to a site builder platform that introduces a groundbreaking method for instant media input, revolutionizing the user's experience. This innovative method is a core feature of the invention and represents a significant advancement in website creation and content management. In addition to instant media input, the innovation also encompasses the integration of AI technology to generate insightful and detailed textual content from media feed descriptions, automatic website creation from content feeds without user input, and a user-friendly site editing interface with menus that appear directly on the section being edited. This interface eliminates the need for an admin section, drastically simplifying the management and creation of websites. Together, these combined features address the need for simplified website creation and content management, significantly improving user experiences and accessibility in the realm of web development.

Figure 1:
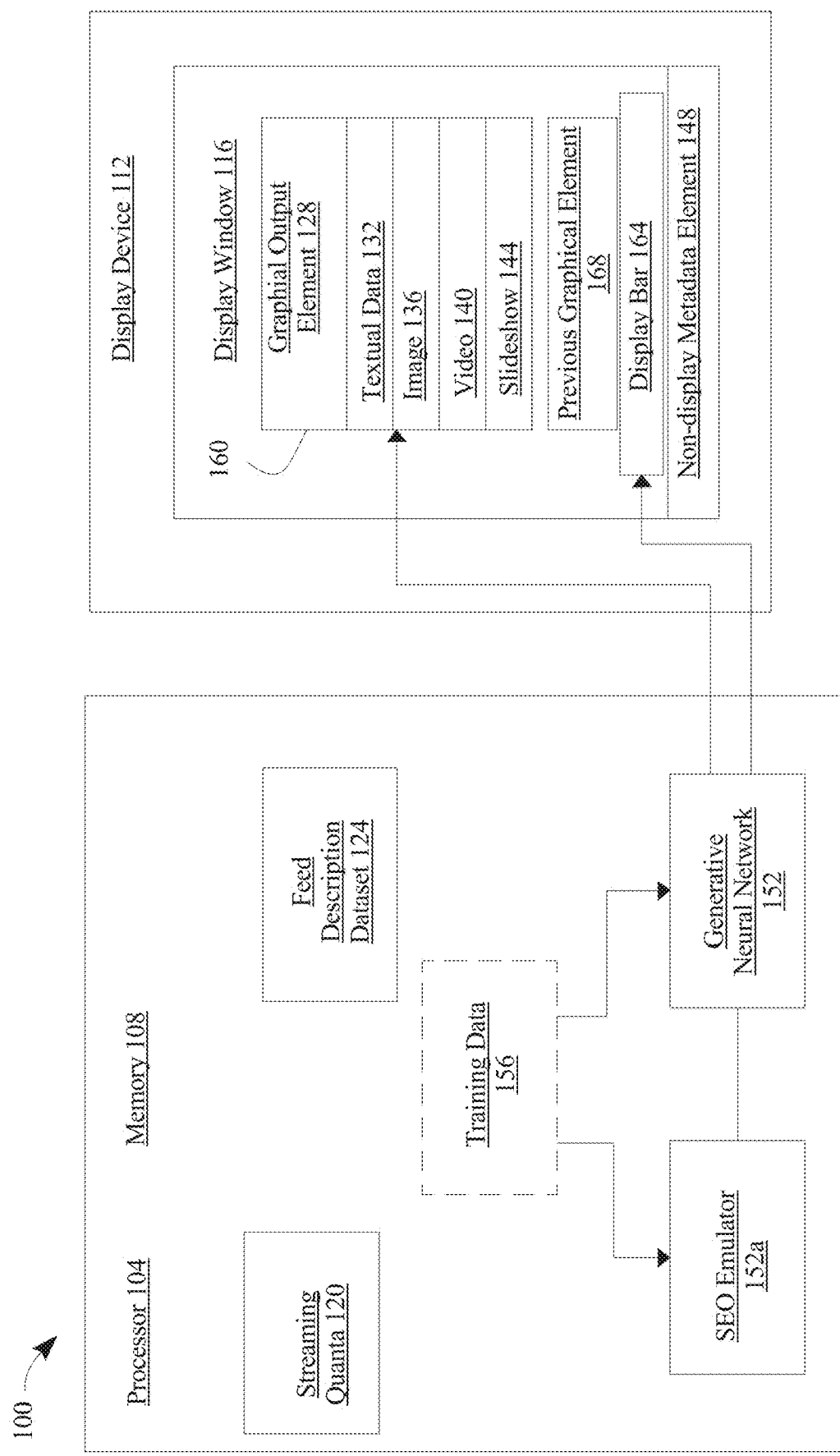
FIG. 1 is a block diagram depicting an exemplary embodiment of an apparatus for generating a dynamically self-modifying graphical interface
Figure 2:
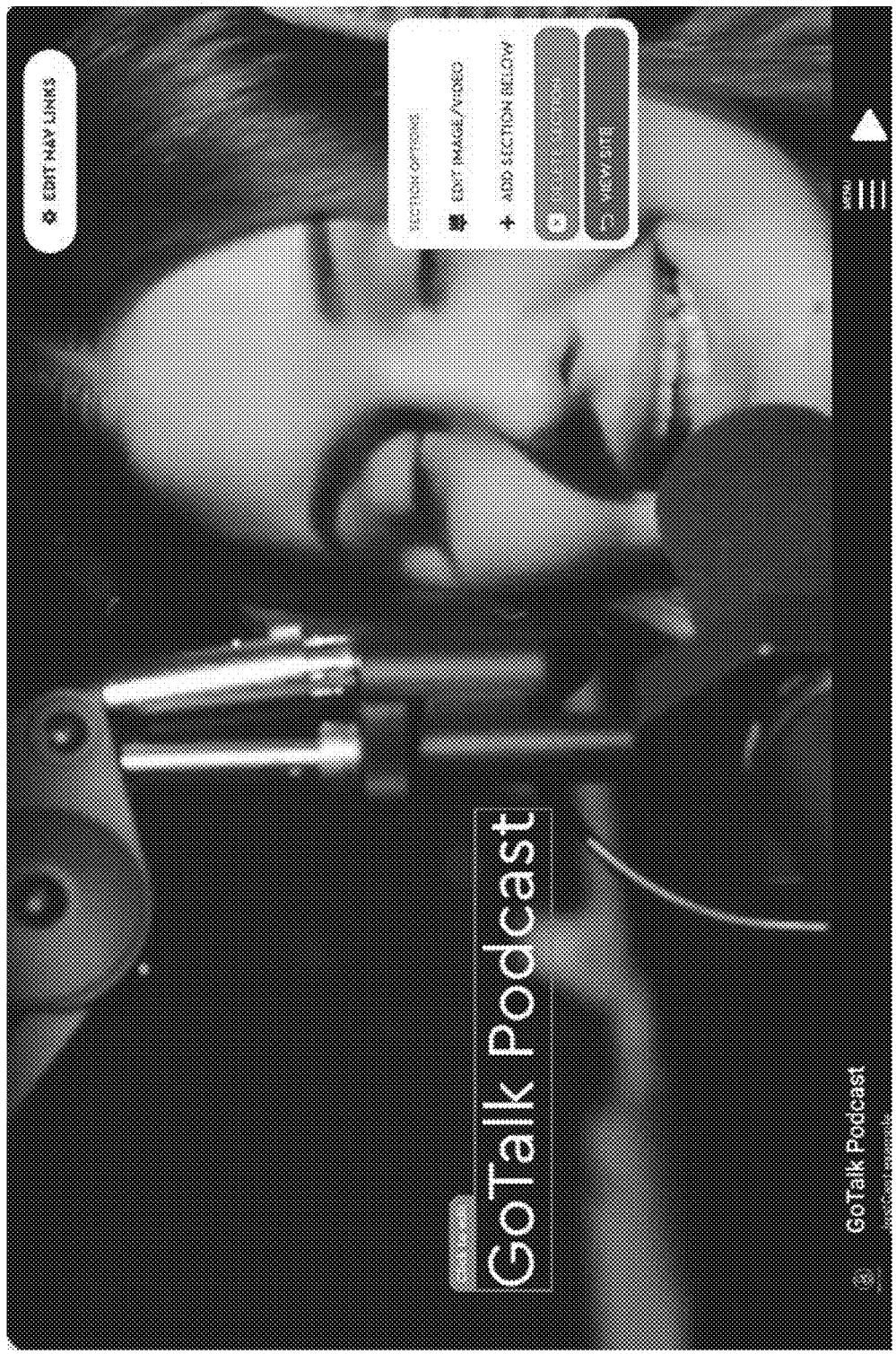
FIG. 2 is a screenshot depicting an exemplary embodiment of a user interface.
Figure 3:
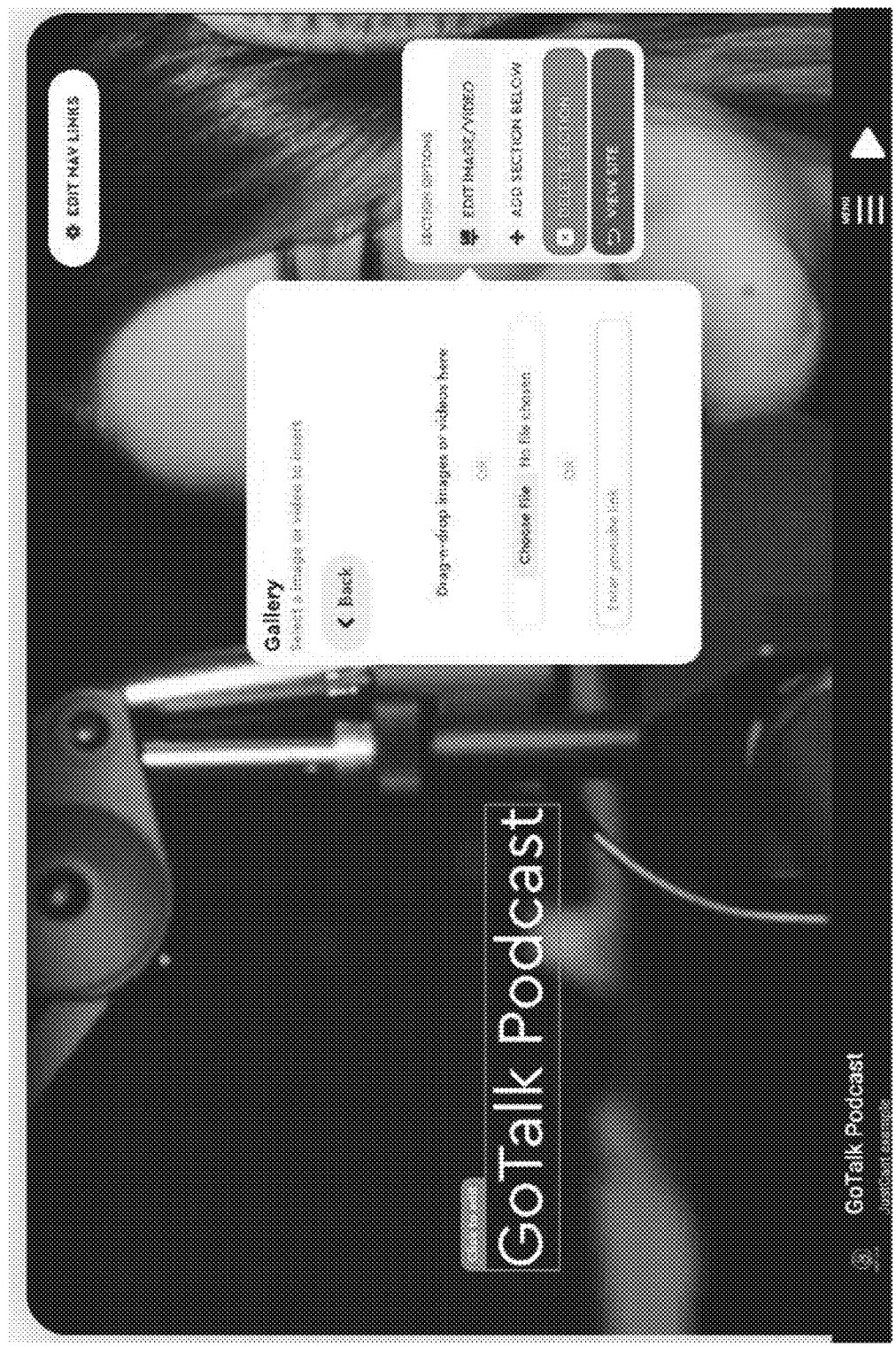
FIG. 3 is a screenshot depicting an exemplary embodiment of a user interface.
Figure 4:
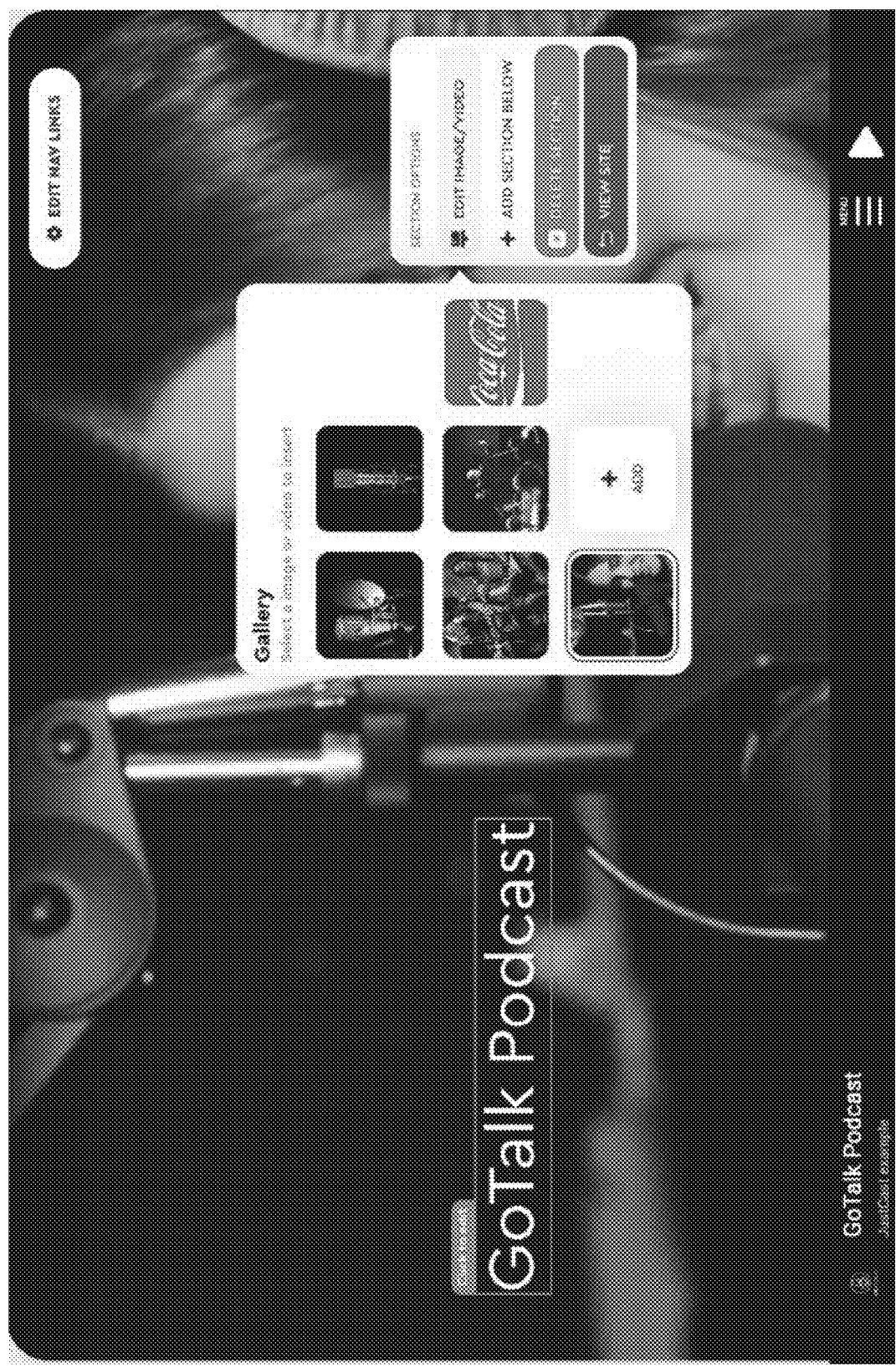
FIG. 4 is a screenshot depicting an exemplary embodiment of a user interface.
Figure 5:
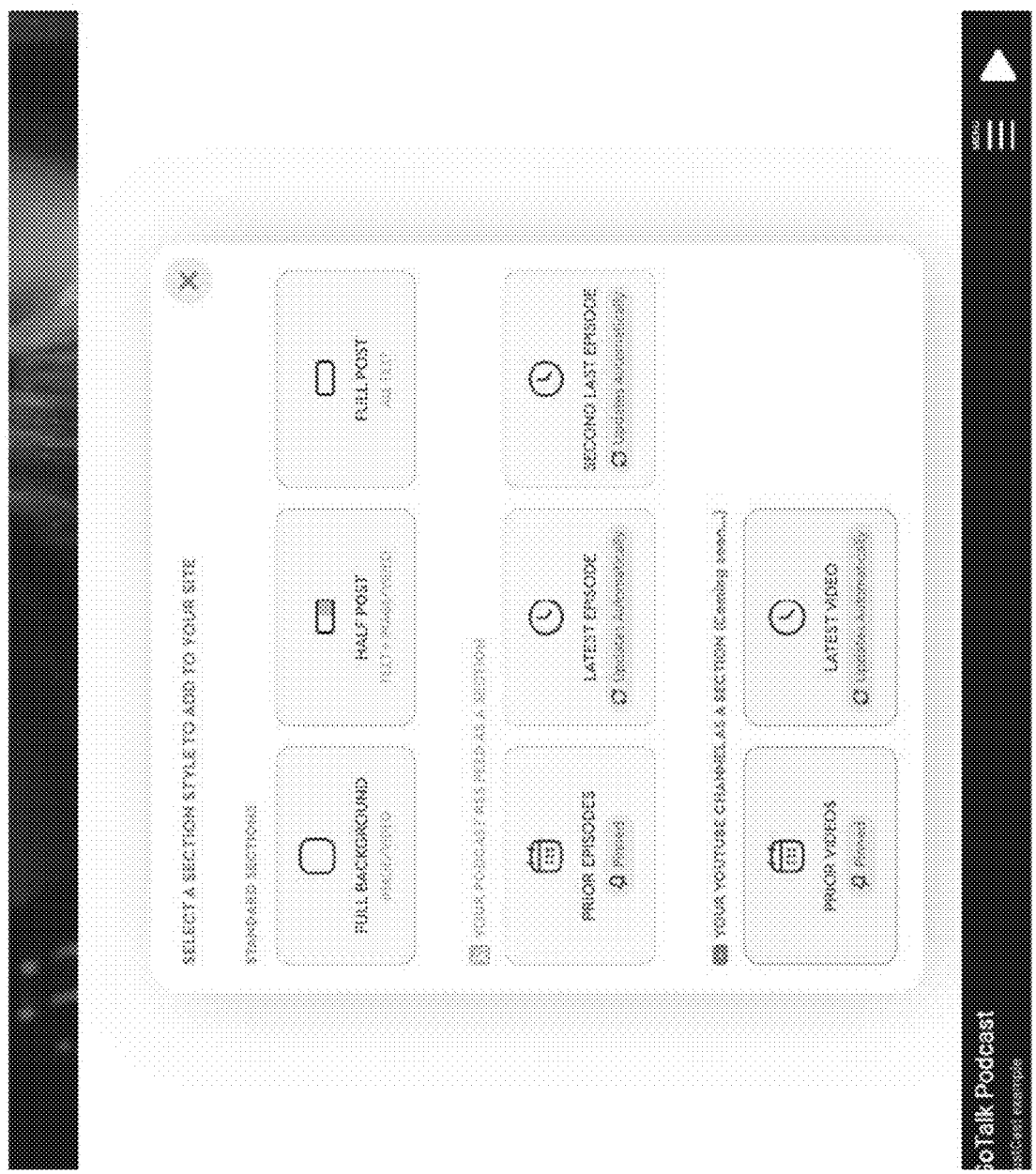
FIG. 5 is a screenshot depicting an exemplary embodiment of a user interface.
Figure 6:
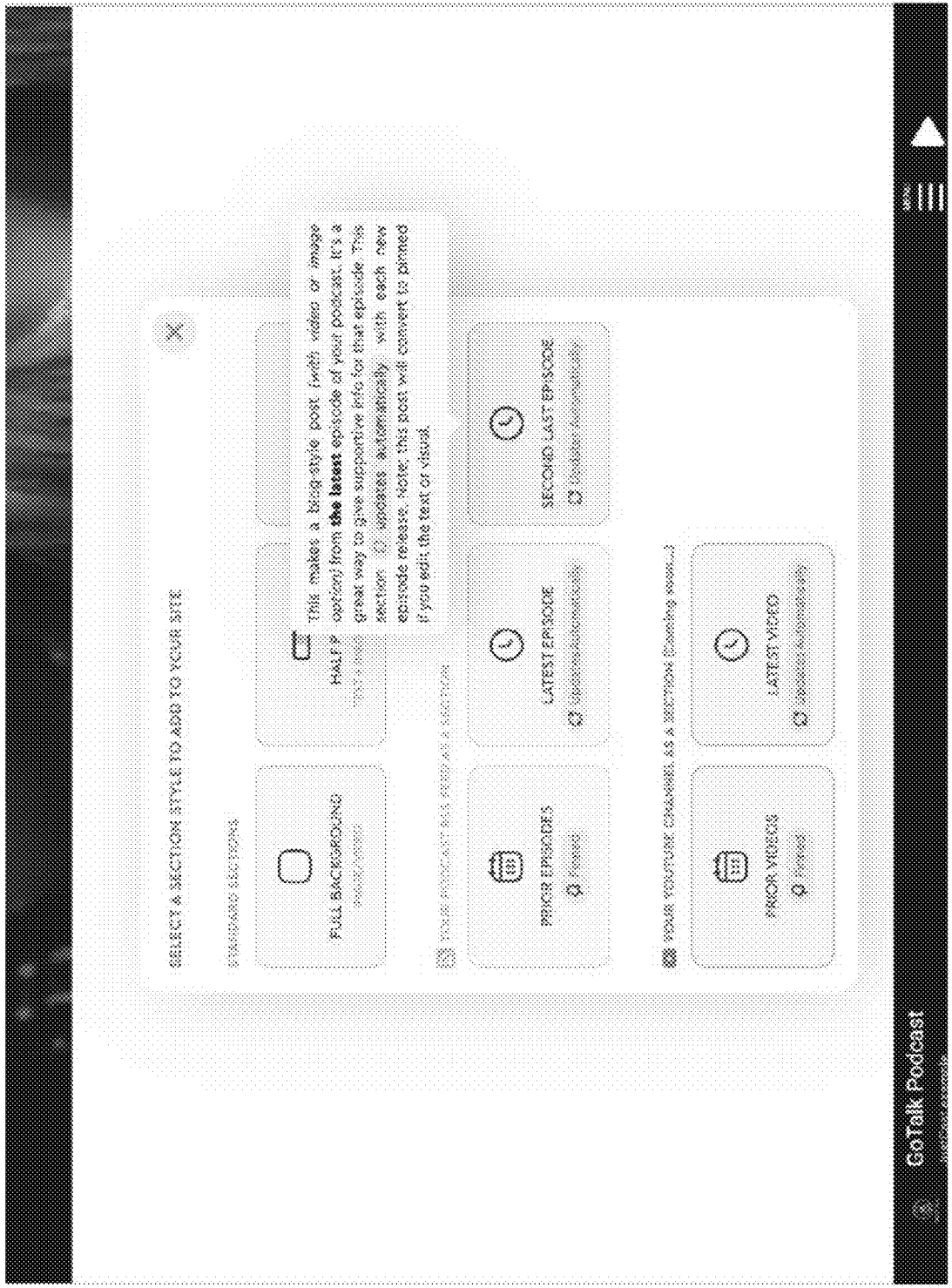
FIG. 6 is a screenshot depicting an exemplary embodiment of a user interface.
Figure 7:
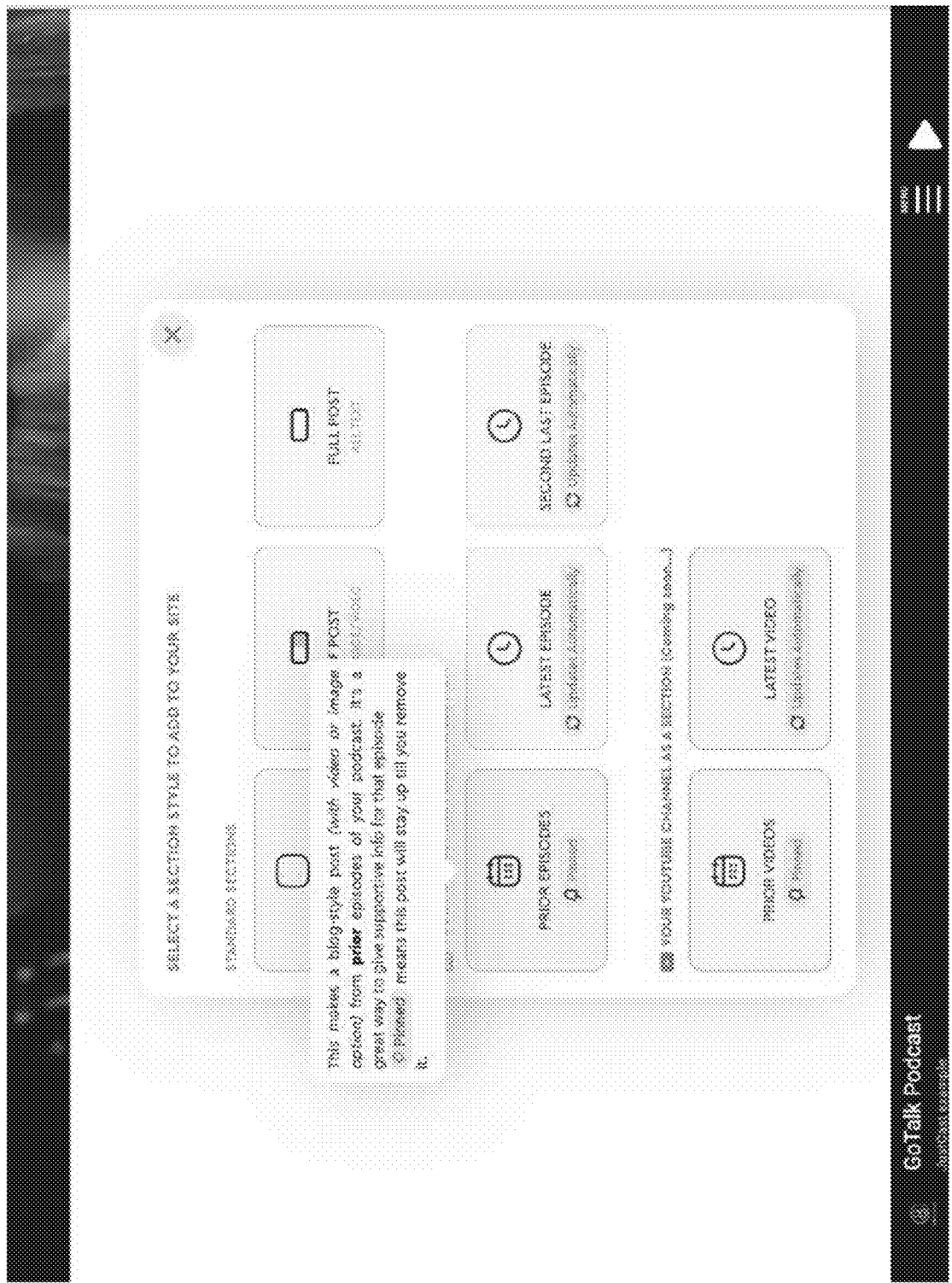
FIG. 7 is a screenshot depicting an exemplary embodiment of a user interface.
Figure 8:
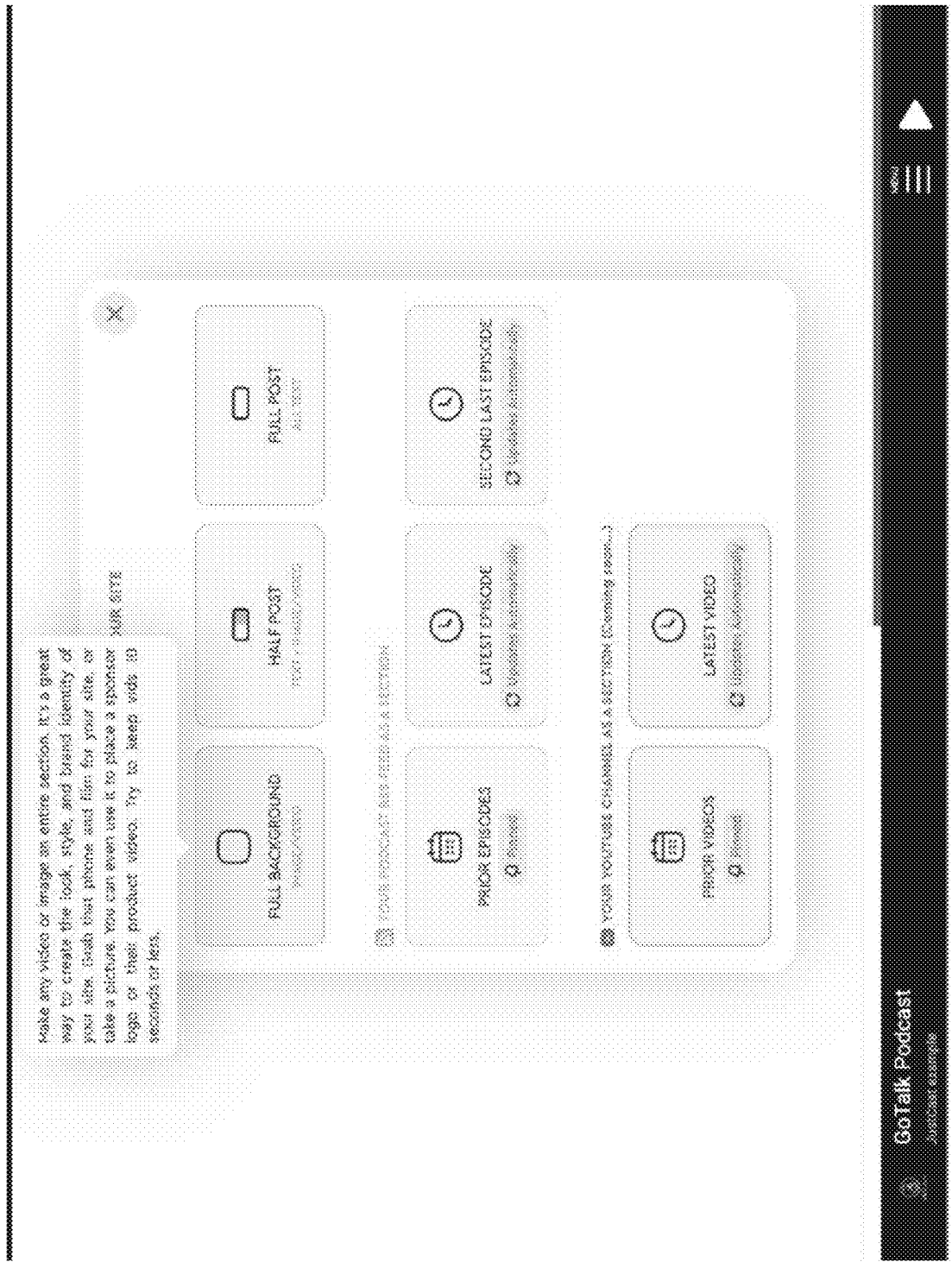
FIG. 8 is a screenshot depicting an exemplary embodiment of a user interface.
Figure 9:
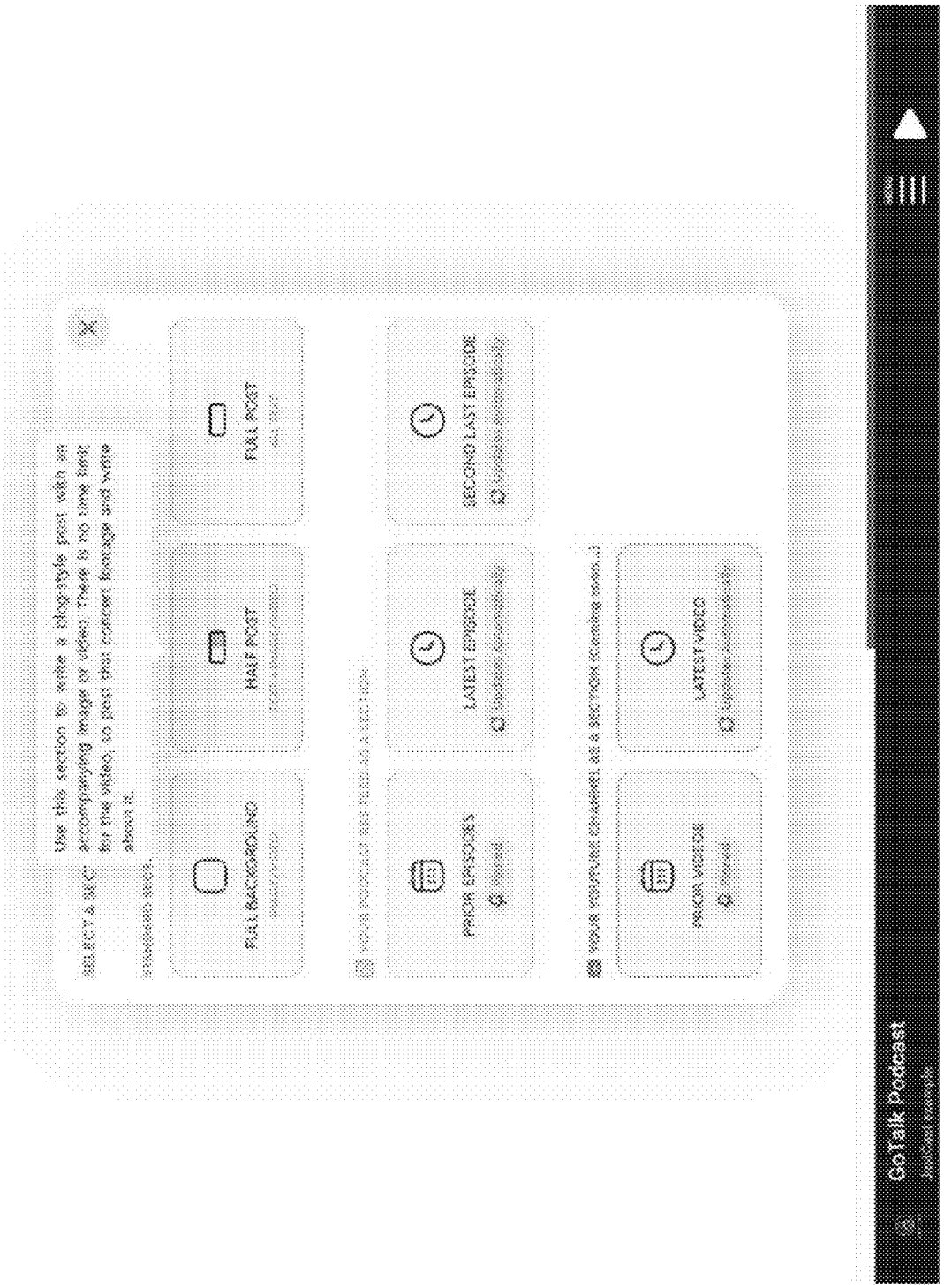
FIG. 9 is a screenshot depicting an exemplary embodiment of a user interface.
Figure 10:
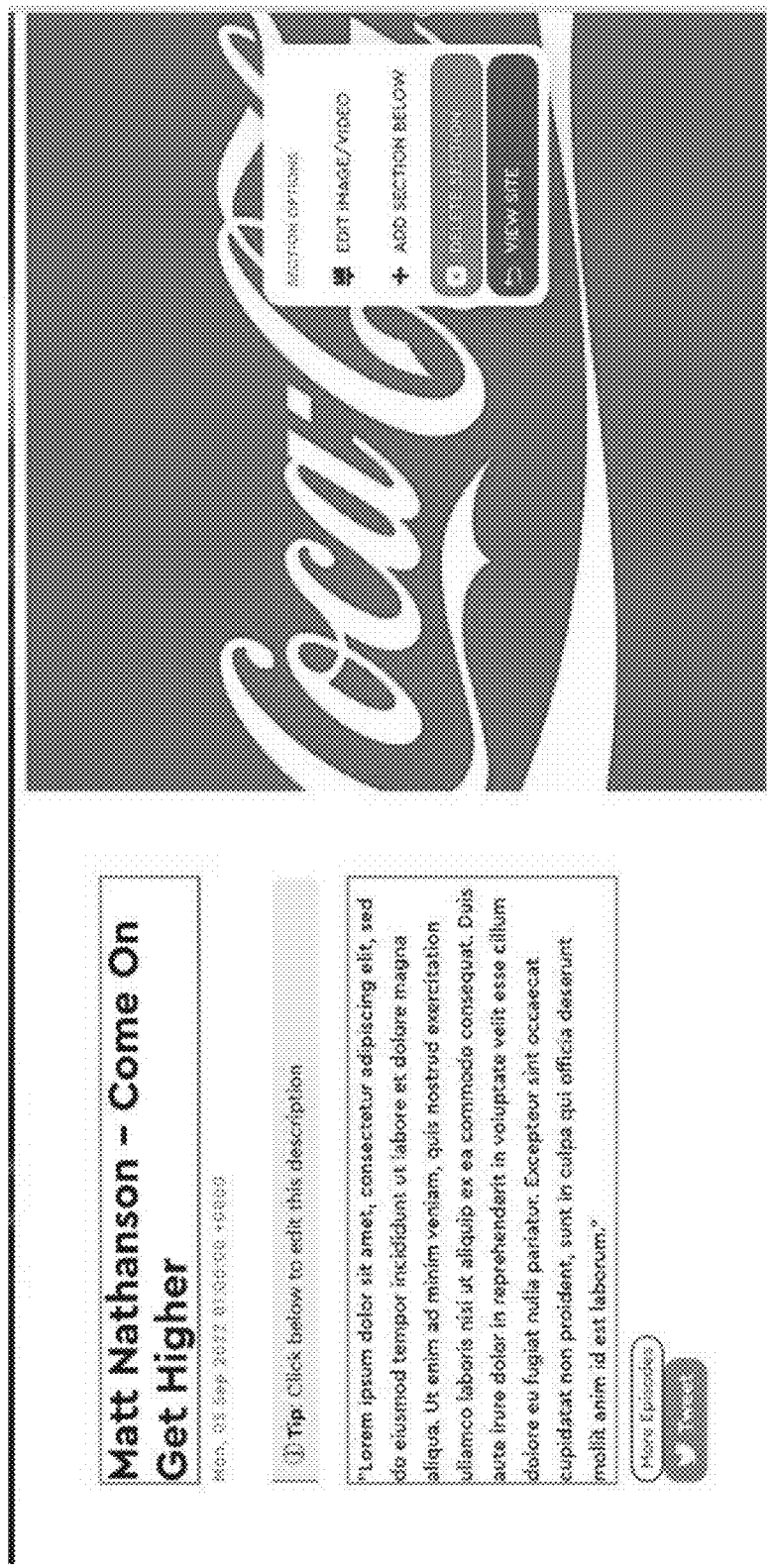
FIG. 10 is a screenshot depicting an exemplary embodiment of a user interface.
Figure 11:
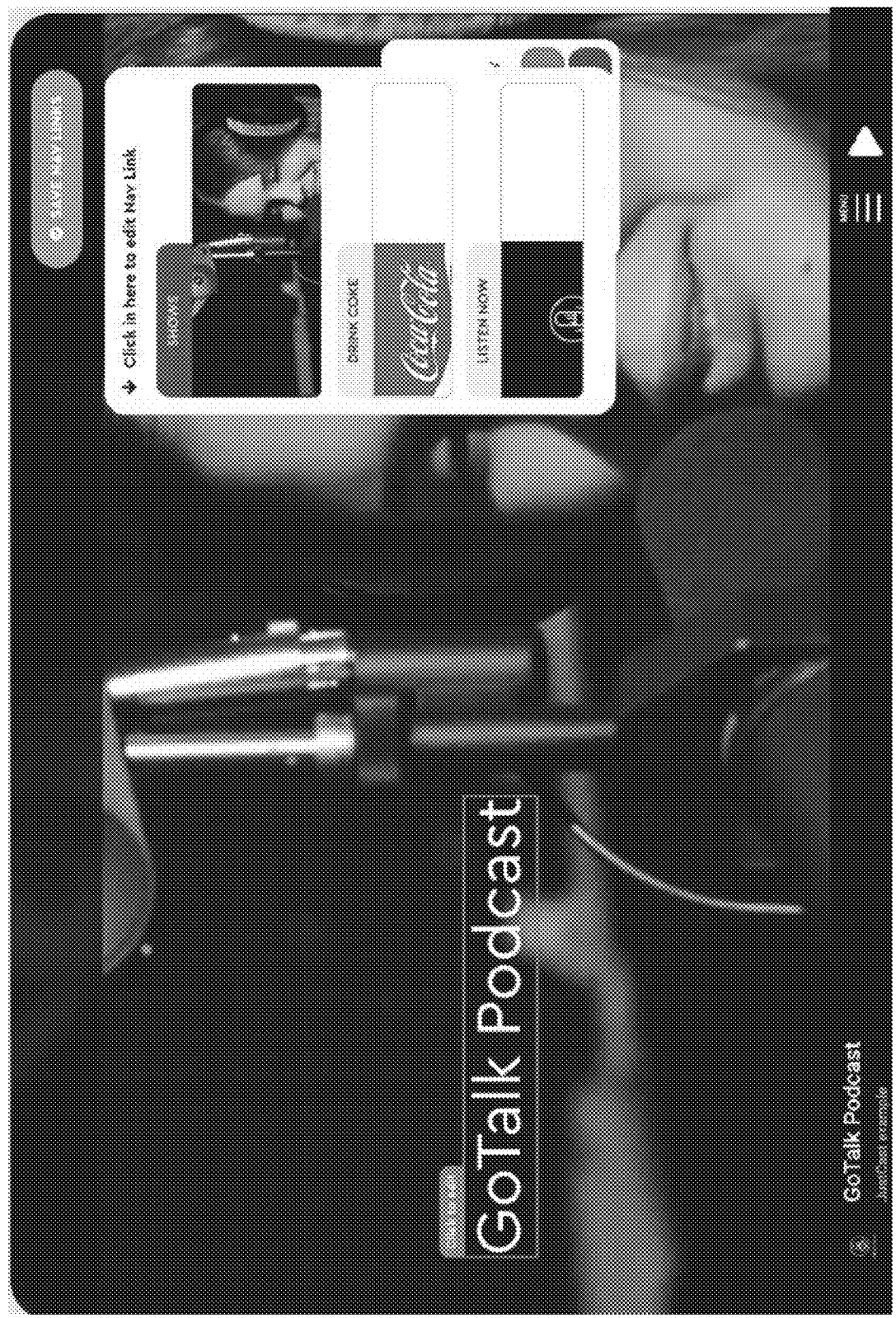
FIG. 11 is a screenshot depicting an exemplary embodiment of a user interface.
Figure 12:
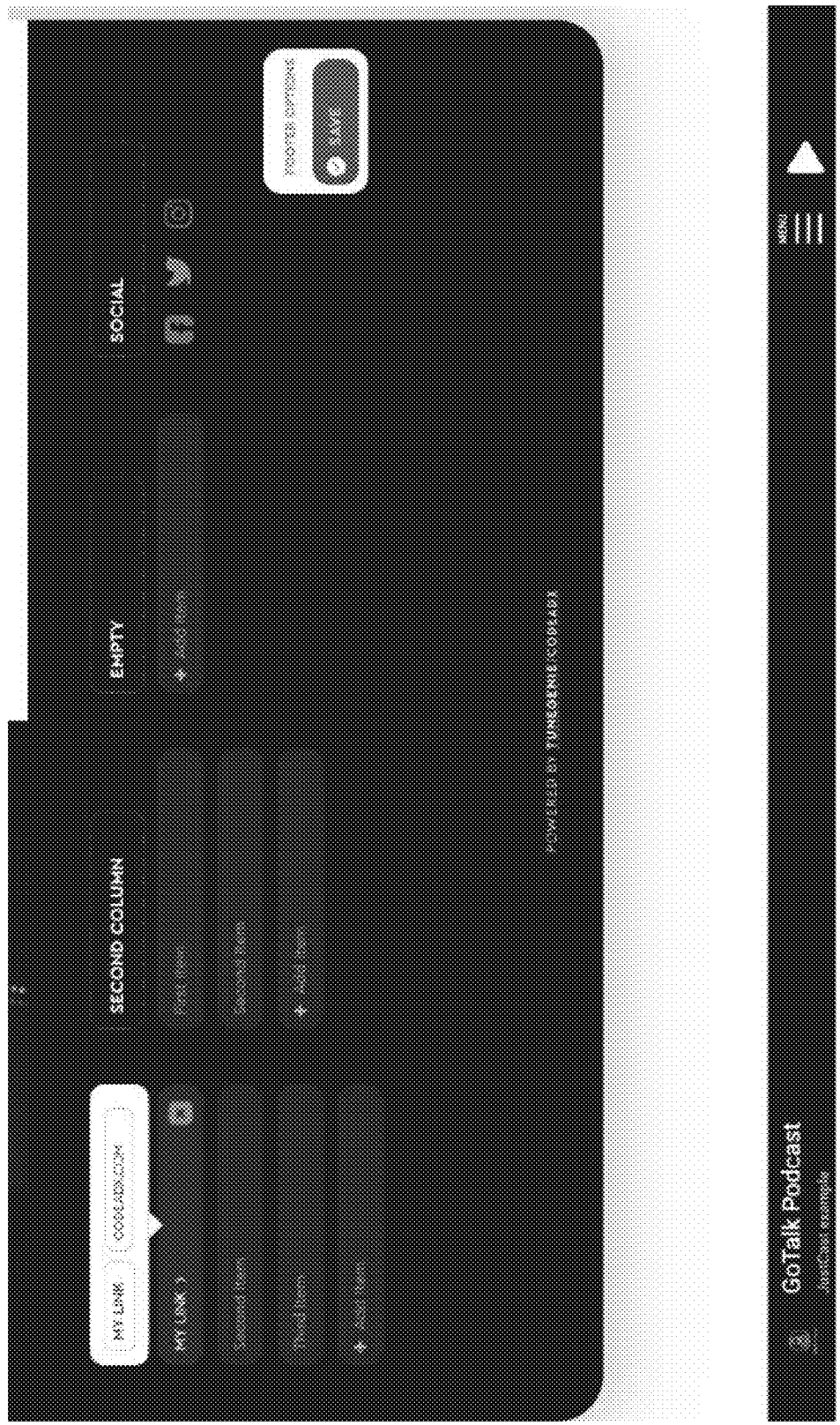
FIG. 12 is a screenshot depicting an exemplary embodiment of a user interface.

Referring now to FIG. 1, a non-limiting example of an embodiment of an apparatus 100 for a dynamically self-modifying graphical interface is illustrated. Apparatus 100 may include a computing device. Apparatus 100 may include a processor 104. Processor 104 may include, without limitation, any processor 104 described in this disclosure. Processor 104 is communicatively connected to a memory 108. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video 140, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Further referring to FIG. 1, processor 104 may be included in a computing device. Computing device may include any computing device as described in this disclosure, including without limitation a microcontroller, microprocessor 104, digital signal processor 104 (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory 108 between computing devices. Computing device may be implemented, as a non-limiting example, using a "shared nothing" architecture.

With continued reference to FIG. 1, processor 104 and/or computing device may be designed and/or configured to perform any method, method step, or sequence of method steps in any embodiment described in this disclosure, in any order and with any degree of repetition. For instance, processor 104 and/or computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 and/or computing device may perform any step or sequence of steps as described in this disclosure in parallel, such as simultaneously and/or substantially simultaneously performing a step two or more times using two or more parallel threads, processor 104 cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, memory 108 contains instructions configuring the at least a processor 104 to configure a display device 112 to generate a display window 116; display device 112 may include without limitation any computing device as described in this disclosure, including for instance a remote device, a client device, a mobile device such as a smartphone or tablet, or the like. Display device 112 may be distinct from a computing device including processor 104 or may be the same device.

Further referring to FIG. 1, memory 108 may contain instructions configuring at least a processor 104 to receive a plurality of streaming quanta 120 and/or other feed data and a feed description dataset 124 associated with the plurality of streaming quanta 120 and/or feed content data. Plurality of quanta may be generated, transmitted, stored, queued, and/or displayed in any manner described in U.S. patent application Ser. No. 16/038,841, filed on Mar. 1, 2019, issued on Jun. 2, 2020 as U.S. Pat. No. 10,673,771 and entitled "PLATFORM-AGNOSTIC THICK-CLIENT SYSTEM FOR COMBINED DELIVERY OF DISPARATE STREAMING CONTENT AND DYNAMIC CONTENT BY COMBINING DYNAMIC DATA WITH OUTPUT FROM A CONTINUOUS QUEUE TRANSMITTER," the entirety of which is incorporated herein by reference and/or in in U.S. patent application Ser. No. 18/138,941, filed on Apr. 25, 2023, and entitled "SYSTEMS AND METHODS FOR ASSOCIATING DUAL-PATH RESOURCE LOCATORS WITH STREAMING CONTENT," the entirety of which is incorporated herein by reference.

With continued reference to FIG. 1, as a non-limiting example, streaming quanta 120 and/or feed content data may include a Really Simple Syndication (RSS) feed. As used in the current disclosure, a "Really Simple Syndication (RSS) feed" is a web feed that allows users and applications to access updates to websites in a standardized, computer-readable format. A subscription to an Feed description data, streaming quanta 120, and/or feed content data may allow a user to keep track of many different websites in a single news aggregator, which may constantly monitor sites for new content, removing the need for the user to manually check them. News aggregators (or "RSS readers") may be built into a browser, installed on a desktop computer, or installed on a mobile device. Web sites may use Feed description data, streaming quanta 120, and/or feed content data to publish frequently updated information, such as blog entries, news headlines, episodes of audio and video 140 series, or for distributing podcasts. As a non-limiting example of feed description data, an RSS document (which may also be called "feed," "web feed," or "channel") may include full or summarized text, and metadata, like a publishing date and author's name. RSS formats may be specified using an XML file.

With continued reference to FIG. 1, processor 104 may identify at least a portion of a Really Simple Syndication (RSS) feed may be comprised of an XML file. As used in the current disclosure, a "Extensible Markup Language" or XML as it is commonly referred to as, is a markup language and file format for storing, transmitting, and reconstructing arbitrary data. An XML file may be configured to store and transport data. An XML file may be defined by a set of rules a set of rules for encoding documents in a format that is both human-readable and machine-readable. An XML file may comprise a Tag and an Element. As used in the current disclosure, "Tag" is a markup construct that begins with <and ends with >. A tag may include a start-tag, an end tag, an empty-element tag, and the like. A start tag may be used to start a section while an end tag may be used to end a section. A empty element tag may be used to generate an empty line within text. As used in the current disclosure, an "element" is a logical document component or plain text that either begins with a start-tag and ends with a matching end-tag or consists only of an empty-element tag. The characters between the start-tag and end-tag, if any, may comprise the content of the XML. In a non-limiting example, a XML file may appear similar to this <greeting>Hello, world!</greeting>. In this example, "<greeting>" is the start-tag. "Hello, World!" is the element, and "</greeting>" is the end tag.

With continued reference to FIG. 1, the characters making up an XML may be divided into markup and content, which may be distinguished by the application of simple syntactic rules. Generally, strings that constitute markup either begin with the character <and end with a>, or they begin with the character & and end with a ';'. Strings of characters that are not markup are content. However, in a CDATA section, the delimiters <![CDATA[and]]> are classified as markup, while the text between them is classified as content. In addition, whitespace before and after the outermost element is classified as markup. An attribute may be a markup construct consisting of a name-value pair that exists within a start-tag or empty-element tag. An example is <img src="madonna.jpg" alt="Madonna"/>, where the names of the attributes are "src" and "alt", and their values are "madonna.jpg" and "Madonna" respectively. Another example is <step number="3">Connect A to B.</step>, where the name of the attribute is "number" and its value is "3". An XML attribute can only have a single value and each attribute can appear at most once on each element. In the common situation where a list of multiple values is desired, this must be done by encoding the list into a well-formed XML attribute[i] with some format beyond what XML defines itself. Usually this is either a comma or semi-colon delimited list or, if the individual values are known not to contain spaces,[ii] a space-delimited list can be used. <div class="inner greeting-box">Welcome!</div>, where the attribute "class" has both the value "inner greeting-box" and also indicates the two CSS class names "inner" and "greeting-box".

Further referring to FIG. 1, apparatus 100 may perform one or more additional processes or steps to sort, categorize, and/or generate website or other display content from streaming quanta 120, feed content data, and/or feed description data. For instance, in an embodiment processor 104 may receive content datum. As used in the current disclosure, "content datum" is the desired content of for the website. Content datum may include a list of content from a plurality of websites. In an embodiment, content datum may include pictures, videos 140, blogs, news, sports, finance, music, text, calendar, and the like. A non-limiting example content datum may include the NBA scores from the last week. In another non-limiting example, content datum may include the users musical preferences and news related to those musical preferences. Content datum may be generated by input from a user or an administrator. Content datum may also be generated using a machine learning model configured to predict the type of content a user would like to view. Content datum may be generated as a function of prior user activity such as time spent on a given website, number of interactions with a website.

With continued reference to FIG. 1, processor 104 may generate Content datum from survey data. As used in the current disclosure, "survey data" is an element of data that is generated from a series of answers to questions by the user. The survey data may include responses to a user survey given to a user. The survey may include questions regarding the users pictures, videos 140, blogs, news, sports, finance, music, text, calendar, and the like. The survey data may be used at various points by apparatus 100 100. For example, the survey data may be a component of content datum. Additionally, survey data may be used to tailor or update website. For example if a user reports an interest in a certain genre of music website may display additional music and artists within that genre. Survey data may be received from a database such as Seed database. Survey data may also be received as a function of a user input.

With continued reference to FIG. 1, processor 104 may identify at least a portion of a Feed description data, streaming quanta 120, and/or feed content data by associating a portion of a Feed description data, streaming quanta 120, and/or feed content data with at least a content datum. Feed description data, streaming quanta 120, and/or feed content data contain a plurality of content. As used in the current disclosure, "content" is an element of media contained within the Feed description data, streaming quanta 120, and/or feed content data. Media may include audio, video 140, pictures, graphics, music, news, eBooks, live events, movies, and the like. Content datum may be associated to the Feed description data, streaming quanta 120, and/or feed content data to identify the desired portions of Feed description data, streaming quanta 120, and/or feed content data to incorporate into a website. A desired portion of a Feed description data, streaming quanta 120, and/or feed content data may be identified by the genre, type, duration, rating, and like of the content of the Feed description data, streaming quanta 120, and/or feed content data. A portion of a Feed description data, streaming quanta 120, and/or feed content data may be one or more elements of content. Once a portion of the Feed description data, streaming quanta 120, and/or feed content data is identified the remainder of the Feed description data, streaming quanta 120, and/or feed content data will be excluded from the use in the website. Processor 104 may additionally filter out any content within Feed description data, streaming quanta 120, and/or feed content data that is not aligned with content datum. The filtration process may be done using a content classifier. In an embodiment, the portions of Feed description data, streaming quanta 120, and/or feed content data that are classified to a content datum may appear within website. Portions of the Feed description data, streaming quanta 120, and/or feed content data that are not classified to a content datum may filter out.

With continued reference to FIG. 1, processor 104 may associate a portion of a Feed description data, streaming quanta 120, and/or feed content data with at least a content datum using a sorting algorithm. As used in the current disclosure, a "sorting algorithm" is an algorithm that puts portions of a Feed description data, streaming quanta 120, and/or feed content data in order as a function of their association with the content datum. A sorting algorithm may sort Feed description data, streaming quanta 120, and/or feed content data by compatibility with content datum, incompatibility with content datum, types of content, length of content, and the like. Efficient sorting may be important for optimizing the efficiency of other algorithms that require input data to be in sorted lists. In an embodiment, a sorting algorithm may include simple sorts, insertion sort, selection sort, efficient sort, merge sort, Heapsort, quicksort, shell sort, bubble sort, comb sort, exchange sort, distribution sort, and the like. In a non-limiting example, a sorting algorithm may be configured to sort the content or XML files of a Feed description data, streaming quanta 120, and/or feed content data in to one or more categories. The categories may include compatible with the content datum and incompatible with the content datum. A sorting algorithm may then order the portions of a Feed description data, streaming quanta 120, and/or feed content data in order of most compatible to least compatible. In some embodiments, this may be done using a feed ranking as mentioned herein below.

With continued reference to FIG. 1, processor 104 may be configured to identify a portion of the Feed description data, streaming quanta 120, and/or feed content data. Identifying a portion of the Feed description data, streaming quanta 120, and/or feed content data may be a function of the classification of the Feed description data, streaming quanta 120, and/or feed content data to a Content datum. This may be done using a content classifier. Inputs to the to the content classifier may include a content datum, Feed description data, streaming quanta 120, and/or feed content data, XML File, a tag, seed data, an element, and the like. The output to the classifier may be an identification of a portion of the Feed description data, streaming quanta 120, and/or feed content data relating to the content datum or an identification of seed data relating to the content datum. Content training data 156 may be a plurality of data entries containing a plurality of inputs that are correlated to a plurality of outputs for training a processor 104 by a machine-learning process to align and classify the Feed description data, streaming quanta 120, and/or feed content data to a Content datum. Content training data 156 may be received from a database. Content training data 156 may comprise correlations between inputs and outputs for content classifier, wherein the inputs may be Feed description data, streaming quanta 120, and/or feed content data, XML files, and/or content datums and the outputs may be portions of Feed description data, streaming quanta 120, and/or feed content data and/or seed data. Content classifier may incorporate feedback wherein prior inputs and outputs from the content classifier may be used as content training data 156 Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. Portions of a Feed description data, streaming quanta 120, and/or feed content data that are classified to a content datum may appear within website. The portions of a Feed description data, streaming quanta 120, and/or feed content data that are not classified to the content datum may not be shown within website.

Still referring to FIG. 1, processor 104 may be configured to rank a portion of an Feed description data, streaming quanta 120, and/or feed content data to determine if it should appear on a website. As used in the current disclosure, a "feed ranking" is a relationship between the portions of the Feed description data, streaming quanta 120, and/or feed content data that have been identified by content classifier. A feed ranking may be used to decide which portion of a Feed description data, streaming quanta 120, and/or feed content data is displayed on a website. In an embodiment, the feed ranking of a portion of the Feed description data, streaming quanta 120, and/or feed content data may be generated as a function of their compatibility with content datum. A Feed ranking may also be generated as a function of the Feed description data, streaming quanta 120, and/or feed content data length, duration, content rating, the rate at which the content refresh, user preference, user interaction, compatibility with the content datum, incompatibility with the content datum, and the like. A feed ranking may also be used to determine where a portion of the Feed description data, streaming quanta 120, and/or feed content data will be located within a web template. In a non-limiting, example portions of the Feed description data, streaming quanta 120, and/or feed content data that is ranked higher may be placed in more favorable positions within a web template. In some embodiments, generating the feed ranking may include linear regression techniques. Processor 104 may be designed and configured to create a machine-learning model using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm mounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

With continued reference to FIG. 1, processor 104 may generate feed ranking using a ranking machine learning model. In embodiments, a Ranking machine learning model may include a classifier, which may be consistent with the classifier disclosed herein. Inputs to the to the machine learning model may include be Feed description data, streaming quanta 120, and/or feed content data, XML files, survey data, and/or content datums and the like. The output of the machine learning model is feed ranking. Ranking machine learning model may by trained using ranking training data 156. Ranking training data 156 may comprise a plurality of data entries containing a plurality of inputs that are correlated to a plurality of outputs for training a processor 104 by a machine-learning process. Ranking training data 156 may include Feed description data, streaming quanta 120, and/or feed content data, XML files, survey data, and/or content datums and the like. Ranking training data 156 may include past feed rankings and past external datum. "Past," refers to the fact that the data was collected prior to the current feed rankings. Ranking training data 156 may be stored in a database, such as a training data 156 database, or remote data storage device, or a user input or device.

Still referring to FIG. 1, feeds, feed description data, and/or streaming quanta 120 may fit and/or be consistent with any one of various content feeds like RSS, YouTube, and TikTok that may occur to persons skilled in the art upon reviewing the entirety of this disclosure. By analyzing the descriptions and metadata within these feeds, AI may be used to enhance the content. This enhancement may include generating posts, descriptions, articles, and other writing related to the content.

Still referring to FIG. 1, memory 108 contains instructions configuring at least a processor 104 to generate an output which may include a graphical output element 128. A "graphical output element 128" is an element of data to be displayed for a user to view in a display window 116. Graphical output element 128 may include textual data 132, such as without limitation any characters that may be encoded using ASCII, Unicode, or other character encoding systems that may occur to a person skilled in the art upon viewing the entirety of this disclosure. Textual data 132 may include a feed summary, where a "feed summary" is a body of text that describes feed content data and/or streaming quanta 120 in form that is condensed, or in other words containing a smaller quantity of data and/or text than the material it describes; feed summary may contain at least a textual element that is not contained in the feed description data.

Further referring to FIG. 1, graphical output element 128 may include an image 136, which may include any digital image 136 that may occur to a person skilled in the art upon viewing the entirety of this disclosure, such as without limitation a jpeg, gif, tif, bmp, or other image 136, which may be static or animated. Graphical output element 128 include a video 140. Graphical output element 128 may include a slide show 144. Images 136, videos 140, video 140 clips, slide show 144 elements, or the like may be received from feed content data, feed description data, streaming quanta 120, or the like.

With continued reference to FIG. 1, output may include a non-display metadata element 148, where a "non-display metadata element 148" is an element of metadata that is not designed to be displayed to a user, but which describes, dictates form of presentation, and/or dictates visibility to and/or communication with web-crawlers or other bots, or the like, such as without limitation <meta> tags, <title> tags, or the like.

Still referring to FIG. 1, generating output, such as without limitation graphical output element 128 and/or non-display metadata element 148, may include generating the graphical output element 128 using a generative neural network 152 trained to input feed description dataset 124 and output graphical elements and/or non-display metadata elements 148. Generative neural network 152 may include any neural network configured to perform generative AI processes as described in further detail below, including without limitation any large language models. Apparatus 100 may instantiate generative neural network 152, for instance by receiving and deploying it, and/or by training generative neural network 152. Training data 156 and/or retraining data 156 used to train generative neural network 152 may include, e.g., a plurality of entries correlating exemplary output text with exemplary input text, such that an error function may be generated where an actual output text deviates from exemplary output text. In some embodiments, training may include use of a search engine optimization (SEO) emulator; SEO emulator 152a may include another machine-learning model and/or neural network, which may be implemented as any type of machine-learning model and/or neural network as disclosed in this disclosure, trained using data correlating search terms to search results, to generate a predictive score indicating degree to which a textual term in graphical output data and/or element of metadata will increase a likelihood of users finding a corresponding webpage, a hitrate, or the like, and outputting a score indicating such likelihood when provided text, image 136, and/or metadata; SEO optimizer may be periodically retrained using updated training data 156. Any or all output data from generative neural network 152 may be fed into SEO emulator 152a, an output of which may be used directly or indirectly for an error function used to correct and/or train generative neural network 152. In some embodiments, when content creators release new content, it may be instantly available as a text description and audio via the Feed description data, streaming quanta 120, and/or feed content data. Apparatus 100 may detect latest content and uses AI to analyze the description. If necessary, the AI enhances the text by adding relevant words or phrases to improve its clarity and optimize it for search engines (SEO). The aim is to increase the content creator's digital footprint, making their content more accessible and boosting popularity.

Continuing to refer to FIG. 1, generative neural network 152 may include a multimodal neural network, such as a multimodal transformer, large language model, or the like.

Still referring to FIG. 1, apparatus 100 is configured to generate graphical output element 128 and/or non-display metadata element 148 using feed description dataset 124 and generative neural network 152; for instance, apparatus 100 may input feed description dataset 124 into generative neural network 152, which may output graphical output element 128 and/or non-display metadata element 148. In some embodiments, generating the graphical output element 128 may include extracting at least a data element from the streaming quanta 120 and/or feed content data, which may include converting it into textual or other data. Generating may include inputting the at least a data element to the generative neural network 152 and generating graphical output element 128 using the at least a data element, the feed description dataset 124, and the generative neural network 152.

Further referring to FIG. 1, apparatus 100 is configured to configure the display device 112 to display, in a field 160 of the display window 116, the graphical output element 128; this may be performed, without limitation, in any manner described in disclosures incorporated by reference herein. In some embodiments, display window 116 may further include a display bar 164 and apparatus 100 may configure display device 112 to output streaming quanta 120 and/or feed content data at the display bar 164; this may be accomplished without limitation as described in disclosures incorporated by reference herein. In some embodiments, and without limitation, field 160 may include a previous graphical output element 168, and apparatus 100 may configure display device 112 to modify the previous graphical output element 168. Modification may include, without limitation, removal or deletion and/or further summarization; for instance generative neural network 152 may summarize a summary to a smaller amount of text to be displayed as pertaining to a previous stream or the like-smaller amount of text may include a link to play previous stream.

Still referring to FIG. 1, apparatus 100 is configured to embed, in the display window 116, the non-display metadata element 148, for instance and without limitation by updating and/or fields 160 for such metadata with non-display metadata element 148.

Further referring to FIG. 1, apparatus 100 is configured to output the plurality of streaming quanta 120 and/or feed content data; this may be performed without limitation as described in disclosures incorporated by reference herein.

With continued reference to FIG. 1, processor 104 may produce graphical output element 128, non-display metadata element 148, and/or one or more other elements of display window 116, and/or may generate display window 116 initially, based on Feed description data, streaming quanta 120, and/or feed content data, which may be performed using generative neural network 152 or any other suitable machine-learning or other process that may occur to persons skilled in the art upon reviewing the entirety of this disclosure. For instance, and without limitation, processor 104 may convert at least a portion of the Feed description data, streaming quanta 120, and/or feed content data into seed data. As used in the current disclosure, "seed data" is the conversion of XML files into a template language that is suitable for a web template. As used in the current disclosure, a "template language" is a language that will allow a user to move data and insert it into a template. Examples of a template language include EJS, Handlebars, PUG, Mustache, React (JSX), and the like. In embodiments, a XML file may be converted in to any of the languages mentioned herein above. Conversion may occur using a XML file converter and similar software. This may include converting XML files in to Hyper Text Markup Language (HTML) files, Extensible Hyper Text Markup Language (XHTML), python, java, C6, Java Script, Ruby, PHP, and the like. As used in the current disclosure, a "web template" is a format for a website. A web template may be used so that the format does not have to be recreated each time it is used. Web templates may support static content, providing basic structure and appearance. A web template may be configured to have an order or a place for a portion of a Feed description data, streaming quanta 120, and/or feed content data to be displayed. An order or place for a portion of the Feed description data, streaming quanta 120, and/or feed content data may be decided as a function of the degree of compatibility of the Feed description data, streaming quanta 120, and/or feed content data to the content datum or a feed ranking. A web template may include a server-side template, a client-side template, an edge-side template, outside template, and/or a distributed template. A website may be generated using a web template by inserting the seed data into the template. A processor 104 may be configured to identify which format or language is suitable for a web template. The processor 104 may be configured to identify the formant or language of a web template by identification of the web template or through electronic communication with the web template. A website may also be generated by inserting local data on into a web template. As used in the current disclosure, "local data" is an element of data that is stored locally on memory 108 or storage that is communicatively connected to the processor 104. In some embodiments, the storage may be a storage device such as a hard drive, solid state drive, and the like. Local data may include any pictures, videos 140, blogs, news, sports, finance, music, text, calendar, and the like that is stored in memory 108 or on a storage device. Local data may be inserted within a web template as a function of user preference. Local may also be incorporated within a web template as a function of the type, genre, content, or quality of the local data compared to the Feed description data, streaming quanta 120, and/or feed content data.

With continued reference to FIG. 1, processor 104 may generate a website from a template processor 104. As used in the current disclosure, a "template processor 104" is an element of software configured to combine templates with a seed data to produce a website. In an embodiment, a template processor 104 may be written in a template language. A template processor 104 may also output documents, web pages, or source code, either in whole or in fragments. A template processor 104 may be included as a part of a web template. A template processing system may include a data model, a source template, and the resulting documents. As used in the current disclosure, a "data model" is an abstract model that organizes elements of data and standardizes how they relate to one another and to the properties of real-world entities. A data model may be a relational database, a source file such as XML file, seed data, an alternate format of flat file database, a spreadsheet or any of other various sources of preformatted data. Some template processing systems are limited in the types of data that can be used. Others are designed for maximum flexibility and allow many different types of data. As used in the current disclosure, a "source template" is a is a reusable source code configuration that defines a source-code build type. A source template may be generated as a function of according to a pre-existing programming language, a specially-defined template language, the features of a hosting software application, a hybrid combination, and the like. A template engine may be used for connecting the data model, processing the code specified in the source template, and directing the output to a specific pipeline, text file, or stream.

With continued reference to FIG. 1, Processor 104 may generate a website as a function of seed data. As used in the current disclosure, a "website" is a collection of one or more web pages and related content that is identified by a common domain name and published on at least one web server. Websites may be dedicated to a particular topic or purpose, such as news, education, commerce, entertainment, social networking, and the like. Website may include both dynamic and static websites. Website may be configured to display all or a portion of a Feed description data, streaming quanta 120, and/or feed content data. The content of the Feed description data, streaming quanta 120, and/or feed content data may display on one or more websites.

With continued reference to FIG. 1, a website may be dynamic or static. As used in the current disclosure, a "static website" is a web page that is delivered to the user's web browser exactly as stored. Static web pages may use HTML documents stored as files in the file system and made available by the web server over HTTP. Static web pages may include web pages stored in a database or pages formatted using a template and served through an application server. As used in the current disclosure, a "dynamic website" is one that changes or customizes itself frequently and automatically. Dynamic websites include a server-side dynamic web page and a client side dynamic webpage. A server-side dynamic web page may be a web page whose construction is controlled by an application server processing server-side scripts. In server-side scripting, parameters may determine how the assembly of every new web page proceeds, including the setting up of more client-side processing. A client-side dynamic web page may process the web page using JavaScript running in the browser as it loads. In embodiments, a web page may be dynamic on the client-side but is still be hosted on a static hosting service such as GitHub Pages or Amazon S3 as long as there isn't any server-side code included.

With continued reference to FIG. 1, website may be represented as a hyperlink. As used in the current disclosure, a "hyperlink" an electronic link providing direct access from one distinctively marked place in a hypertext or hypermedia document to another in the same or a different website. A hyperlink may point to a whole website or to a specific element within a website. Hypertext is text with hyperlinks. The text that is linked from is called anchor text. containing a hyperlink is known as its source document. In non-limiting example, a user may be connected to the Website. Hyperlinks may be used to implement reference mechanisms such as tables of contents, footnotes, bibliographies, indexes, letters, and glossaries. In some hypertext, hyperlinks can be bidirectional: they can be followed in two directions, so both ends act as anchors and as targets. More complex arrangements exist, such as many-to-many links.

With continued reference to FIG. 1, a hyperlink may grant access to a website as a function of a token based authentication. As used in the current disclosure, "Token-based authentication" is an encrypted security tokens which allows a user to verify their identity to websites. The security token may provide a user's with access to protected pages and resources for a limited period of time without having to re-enter their username and password. Token based authentication may require a user to initially login using their credentials, which may issue an access request to a server or protected resource. A processor 104 may verify the login information to determine that the user should have access. This may involve checking the password entered against the username provided. The processor 104 may then generate a secure, signed authentication token for the user for a specific period of time. The security token may then be transmitted back to the user's browser, which stores it for access to future website visits. When the user moves on to access a new website, the security token may be decoded and verified. If there is a match, the user will be allowed to proceed. The token may remain active until the user logs out or the period of time lapses. Examples of security tokens include connected tokens, contactless tokens, disconnected tokens, software tokens, JSON Web Token (JWT).

With continued reference to FIG. 1, a graphical user interface (GUI) 136 may be used to display website. As used in the current disclosure, a "graphical user interface" is a form of user interface that allows users to interact with electronic devices through graphical icons. GUI may include a plurality of lines, images 136, symbols. GUI may be displayed on a display device 112. "Display device 112", for the purposes of this disclosure, refers to an electronic device for the visual presentation of information. Display device 112 may include, but is not limited to, a smartphone, tablet, laptop, monitor, tablet, and the like. Display device 112 may include a separate device that includes a transparent screen configured to display computer generated images 136 and/or information. The user may view the information displayed on the display device 112 in real time. A GUI may be used through direct manipulation of the graphical elements.

With continued reference to FIG. 1, processor 104 may generate a website using a "drag and drop" method. This may include dragging and dropping the identified Feed description data, streaming quanta 120, and/or feed content data into a web template. In an embodiment, drag and drop may be done using GUI. As used in the current disclosure, "Drag and drop" is a pointing device gesture in which the user selects a virtual object by "grabbing" it (usually by clicking a mouse button) and dragging it to a different location or onto another virtual object (usually by holding down the aforementioned mouse button). In general, it can be used to invoke many kinds of actions or create various types of associations between two abstract objects. Actions may include inserting identified portions of a Feed description data, streaming quanta 120, and/or feed content data into a web template. This may also include reordering portions of the Feed description data, streaming quanta 120, and/or feed content data within a web template.

Still referring to FIG. 1, apparatus 100 may perform any or all of the above processes or process steps iteratively, continually updating display content and/or metadata. For instance, apparatus 100 may monitor feeds through change detection at some regular polling interval such as without limitation every 15 minutes. When new content is released, CodeADX automatically creates and publishes an update. This streamlined process may ensure that the content remains updated and enhanced without the need for user interaction and is optimized for SEO.

Automatic Website Creation: An automatic website creation module may simplify the process by generating websites automatically from content feeds: (Feed description data, streaming quanta 120, and/or feed content data, Podcast Feed description data, streaming quanta 120, and/or feed content data, YouTube video 140 descriptions, Instagram, TikTok, Twitter, and others) without requiring manual user input. Websites are continuously updated with fresh content from content feeds, ensuring user engagement and reducing the burden of manual updates.

AI-Driven Content Generation: Described herein is an AI module capable of analyzing media feed descriptions from various sources, including Feed description data, streaming quanta 120, and/or feed content data, Podcast Feed description data, streaming quanta 120, and/or feed content data, YouTube video 140 descriptions, Instagram, TikTok, Twitter, and others. The AI module generates insightful and detailed textual content automatically, enhancing the depth and context of website posts.

Simplified Site Editing: An intuitive menu-driven interface may simplify site editing. Menus are contextually displayed on the section being edited, eliminating the need for a separate admin section. Users, regardless of technical expertise, can easily modify site content, eliminating complexity.

Efficiency and Time Savings: Traditional website management often involves manual updates, consuming valuable time and requiring skill. The automatic website creation from content feeds, and content posts generated by AI, eliminates this need, ensuring that websites are continuously refreshed with new content. This automation enables anyone, regardless of skill level, to have a stunning website with relevant content effortlessly.

Embedded Media Player Bar: An embedded media player bar enhances user engagement by providing centralized control of audio and video 140 playback within websites. Seamless multimedia experiences are offered to website visitors, contributing to a captivating user experience.

Novel Method for Instant Media Input: Each website section may serve as a drop zone where users can drag and drop or insert media files (images 136 or videos 140) directly from their local devices. (media file URL can also be used). Upon dropping (placing in a site section), a temporary local URL is generated, enabling instant rendering of the media within the website section without the need for lengthy uploads. Simultaneously, a background process creates a queue for file candidates that may need to be uploaded to remote servers in the future. When users choose to save their changes, the background process uploads the media files to remote servers, replacing temporary local URLs with online URLs seamlessly. This innovative method provides website operators with split-second responsiveness, thanks to the utilization of existing web browser APIs that create temporary local URLs for media files, facilitating instant rendering within website sections without requiring traditional file uploads. Giving website operators the ability to see the visual impact of added videos 140 or images 136 instantly, unleashing their creativity. This rapid visualization of the site empowers site operators to experiment within seconds, fine-tuning the look and feel of their websites to perfection. The immediate visualization not only streamlines the design process but also encourages users to explore and innovate, resulting in visually stunning websites that captivate audiences.

Search Engine Optimization (SEO): Transcribed audio and video 140 content, from the content feeds, becomes searchable by search engines. AI-driven analysis identifies keywords and metadata, improving search engine rankings and visibility.

Referring now to FIGS. 2-12, exemplary screenshots of various exemplary user interfaces for an apparatus 100 for creating dynamic websites are shown.

Figure 13:
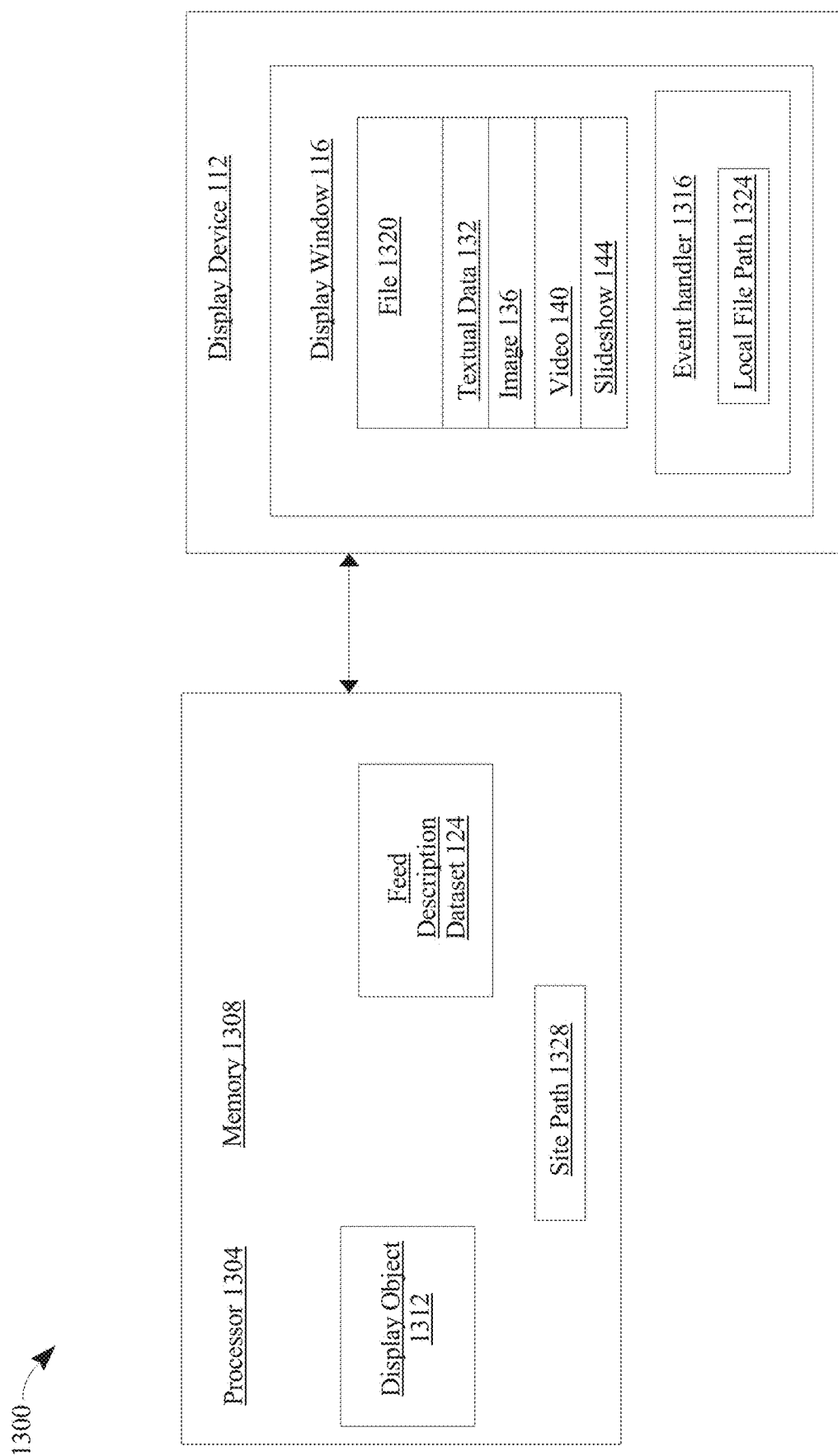
FIG. 13 is a block diagram depicting an exemplary embodiment of an apparatus for a dynamically modifiable graphical interface.

Referring now to FIG. 13, an exemplary embodiment of an apparatus 100 for a dynamically modifiable graphical interface is illustrated. Apparatus 1300 may include at least a processor 1304 and a memory 1308 communicatively connected to the at least a processor 1304. Memory 1308 may contain instructions configuring the at least a processor 1304 to generate a display object 1312 that configures a display device 112 to generate a display window 116; for instance and without limitation as described in this disclosure and/or disclosures incorporated herein by reference. Display window 116 may include a file 1320 addition event handler 1316, where an "event handler 1316" is a program, function, routine, or the like that is executed and/or called upon occurrence of an event such as a click, mouse-over, keystroke, or other user interaction with display window 116; for instance, and without limitation, an event handler 1316 may be triggered by a user dragging and dropping an image 136 onto display window 116, positioning the image 136 within display window 116, or the like. In an embodiment, event handler 1316 may configure the display device 112 to receive a user command to add a file 1320 to the display window 116, such as user browsing to the file 1320, dragging the file 1320 and dropping it onto the display window 116 and/or a location thereon, or the like; user command may specify by movements of file 1320, directional indications, textual entries or the like one or more attributes of display such as location, sizing, transparency, color, use in a background or the like for the file 1320. File 1320 may be an image 136, an output for a feed and/or plurality of streaming content, one or more output bars as described in disclosures incorporated herein by reference, or the like.

Still referring to FIG. 13, event handler 1316 configures display device 112 to determine a local file path 1324 for the file 1320, where a "local file path 1324" as used herein is a path to a memory 1308 location, folder, or the like on display device 112. Local file path 1324 may indicate where file 1320 is stored and/or a link, shortcut, virtual address, or the like using which file 1320 may be accessed on display device 112.

Continuing to refer to FIG. 13, event handler 1316 configures display device 112 to modify the display window 116 to display the file 1320 in the display window 116 using the local file path 1324. For instance, and without limitation, display window 116 may be configured according to a protocol whereby an image 136 or other element is embedded and therefore displayed by identifying a path at which the image 136 or other element is located using, for instance, an <img> tag in an HTML file 1320 or the like. Use of local path may enable file 1320 to display in display window 116 and give user an ability to see what the display window 116 will look like with the new file 1320.

Still referring to FIG. 13, event handler 1316 configures display device 112 to transmit the file 1320 and the local file path 1324 to the apparatus 100, where transmission may be effected using any form of electronic communication, such as file 1320 transfer protocol (FTP), or the like.

With continued reference to FIG. 13, processor 1304 is configured to receive file 1320 and local file path 1324 from display device 112. Processor 1304 is further configured to generate a site path 1328 for the file 1320 based on the local file path 1324, where a "site path 1328" is defined as a path permitting inclusion of the file 1320 in display window 116 for users of devices other than display device 112 and apparatus 100; for instance, site path 1328 may be a universal path such as a uniform resource locator (URL) for file 1320, permitting its embedding in display window 116 to cause its display even where access to local path is not available.

Further referring to FIG. 13, processor 1304 is configured to modify, using the site path 1328, the display object 1312 to configure remote devices to display the modified display window 116 displaying the file 1320. For instance, display object 1312 may output configuration such as HTML or the like that causes display window 116 on a remote device to display with added file 1320 using a URL or other site path 1328; configuration of display windows 116 on remote and/or display devices 112 may be performed, without limitation, as described in this disclosure and/or any disclosure incorporated herein by reference. Processor 1304 may reconfigure the display device 112 using the modified display object 1312.

Still referring to FIG. 13, apparatus 1300 may confer various advantages. For instance, apparatus 100 may offer a seamless way for proprietors or purveyors of websites to manage then. Unlike traditional website editors that require users to upload assets like images 136 or videos 140 and wait for the upload to finish, apparatus 100 may allow users to drag and drop (or attach) media directly where they want it on the site. Once a file 1320 is dropped, apparatus 100 may use the browser's createObjectURL API or the like to generate a localized URL, instantly rendering the file 1320 on screen, even if it's deleted from the user's device. When users save and update their website, apparatus 100 may upload the file 1320s in the background and automatically swap the localized URLs with online URLs without disrupting the user experience. This may result in an instant visual display of the image 136 and/or video 140, making it simple for anyone to manage the site. In addition, any process above may be combined with any other process described in this disclosure. By combining such elements as SEO optimization, seamless media management (Links), and content feed enhancement embodiments described herein may deliver an intuitive system that automates content enhancement, website creation and management, and SEO optimization. The result is a user-friendly platform that produces visually stunning websites and mobile PWAs (Progressive Web Apps) with enhanced content. It simplifies site management and improves the user experience without requiring technical expertise.

Figure 14:
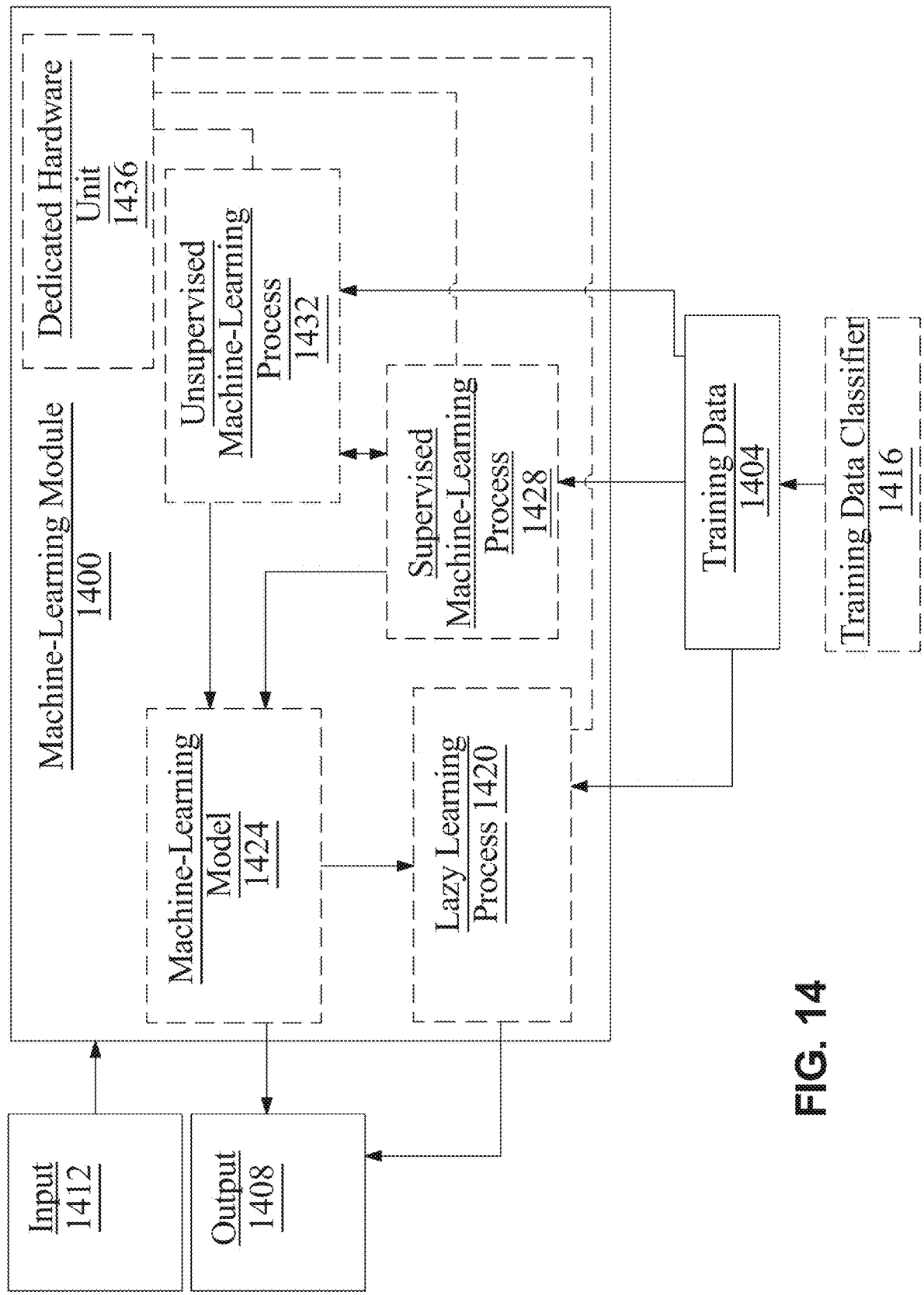
FIG. 14 is a box diagram of an exemplary machine learning model.

Referring now to FIG. 14, an exemplary embodiment of a machine-learning module 1400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 156 1404 to generate an algorithm instantiated in hardware or software logic, data structures, and/or functions that will be performed by a computing device/module to produce outputs 1408 given data provided as inputs 1412; this is in contrast to a non-machine learning software program where the commands to be executed are determined in advance by a user and written in a programming language.

Still referring to FIG. 14, "training data 156," as used herein, is data containing correlations that a machine-learning process may use to model relationships between two or more categories of data elements. For instance, and without limitation, training data 156 1404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 156 1404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 156 1404 according to various correlations; correlations may indicate causative and/or predictive links between categories of data elements, which may be modeled as relationships such as mathematical relationships by machine-learning processes as described in further detail below. Training data 156 1404 may be formatted and/or organized by categories of data elements, for instance by associating data elements with one or more descriptors corresponding to categories of data elements. As a non-limiting example, training data 156 1404 may include data entered in standardized forms by persons or processes, such that entry of a given data element in a given field 160 in a form may be mapped to one or more descriptors of categories. Elements in training data 156 1404 may be linked to descriptors of categories by tags, tokens, or other data elements; for instance, and without limitation, training data 156 1404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 14, training data 156 1404 may include one or more elements that are not categorized; that is, training data 156 1404 may not be formatted or contain descriptors for some elements of data. Machine-learning algorithms and/or other processes may sort training data 156 1404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data 132, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 156 1404 to be made applicable for two or more distinct machine-learning algorithms as described in further detail below. Training data 156 1404 used by machine-learning module 1400 may correlate any input data as described in this disclosure to any output data as described in this disclosure.

Further referring to FIG. 14, training data 156 may be filtered, sorted, and/or selected using one or more supervised and/or unsupervised machine-learning processes and/or models as described in further detail below; such models may include without limitation a training data 156 classifier 1416. Training data 156 classifier 1416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 1400 may generate a classifier using a classification algorithm, defined as a processes whereby a computing device and/or any module and/or component operating thereon derives a classifier from training data 156 1404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With further reference to FIG. 14, training examples for use as training data 156 may be selected from a population of potential examples according to cohorts relevant to an analytical problem to be solved, a classification task, or the like. Alternatively or additionally, training data 156 may be selected to span a set of likely circumstances or inputs for a machine-learning model and/or process to encounter when deployed. For instance, and without limitation, for each category of input data to a machine-learning process or model that may exist in a range of values in a population of phenomena such as images 136, user data, process data, physical data, or the like, a computing device, processor 104, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor 104, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 14, computer, processor 104, and/or module may be configured to sanitize training data 156. "Sanitizing" training data 156, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 14, images 136 used to train an image 136 classifier or other machine-learning model and/or process that takes images 136 as inputs or generates images 136 as outputs may be rejected if image 136 quality is below a threshold value. For instance, and without limitation, computing device, processor 104, and/or module may perform blur detection, and eliminate one or more Blur detection may be performed, as a non-limiting example, by taking Fourier transform, or an approximation such as a Fast Fourier Transform (FFT) of the image 136 and analyzing a distribution of low and high frequencies in the resulting frequency-domain depiction of the image 136; numbers of high-frequency values below a threshold level may indicate blurriness. As a further non-limiting example, detection of blurriness may be performed by convolving an image 136, a channel of an image 136, or the like with a Laplacian kernel; this may generate a numerical score reflecting a number of rapid changes in intensity shown in the image 136, such that a high score indicates clarity and a low score indicates blurriness. Blurriness detection may be performed using a gradient-based operator, which measures operators based on the gradient or first derivative of an image 136, based on the hypothesis that rapid changes indicate sharp edges in the image 136, and thus are indicative of a lower degree of blurriness. Blur detection may be performed using Wavelet-based operator, which takes advantage of the capability of coefficients of the discrete wavelet transform to describe the frequency and spatial content of images 136. Blur detection may be performed using statistics-based operators take advantage of several image 136 statistics as texture descriptors in order to compute a focus level. Blur detection may be performed by using discrete cosine transform (DCT) coefficients in order to compute a focus level of an image 136 from its frequency content.

Continuing to refer to FIG. 14, computing device, processor 104, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor 104, and/or module may convert a smaller number of units, such as in a low pixel count image 136, into a desired number of units, for instance by upsampling and interpolating. As a non-limiting example, a low pixel count image 136 may have 100 pixels, however a desired number of pixels may be. Processor 104 may interpolate the low pixel count image 136 to convert the 100 pixels into pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data 156. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image 136 classifier, a machine-learning model may have a set of interpolation rules trained by sets of highly detailed images 136 and images 136 that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor 104, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor 104, and/or module may use averaging, such as luma or chroma averaging in images 136, to fill in data units in between original data units.

In some embodiments, and with continued reference to FIG. 14, computing device, processor 104, and/or module may down-sample elements of a training example to a desired lower number of data elements. As a non-limiting example, a high pixel count image 136 may have 256 pixels, however a desired number of pixels may be. Processor 104 may down-sample the high pixel count image 136 to convert the 256 pixels into pixels. In some embodiments, processor 104 may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 14, machine-learning module 1400 may be configured to perform a lazy-learning process 1420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 156 1404. Heuristic may include selecting some number of highest-ranking associations and/or training data 156 1404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 14, machine-learning processes as described in this disclosure may be used to generate machine-learning models 1424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory 108; an input is submitted to a machine-learning model 1424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1424 may be generated by creating an artificial neural network, such as a convolutional neural network comprising an input layer of nodes, one or more intermediate layers, and an output layer of nodes. Connections between nodes may be created via the process of "training" the network, in which elements from a training data 156 1404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 14, machine-learning algorithms may include at least a supervised machine-learning process 1428. At least a supervised machine-learning process 1428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs, outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 156 1404. Persons skilled in the art, upon reviewing the entirety of this disclosure, will be aware of various possible variations of at least a supervised machine-learning process 1428 that may be used to determine relation between inputs and outputs. Supervised machine-learning processes may include classification algorithms as defined above.

With further reference to FIG. 14, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data 156 is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 14, a computing device, processor 104, and/or module may be configured to perform method, method step, sequence of method steps and/or algorithm described in reference to this figure, in any order and with any degree of repetition. For instance, a computing device, processor 104, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor 104, and/or module may perform any step, sequence of steps, or algorithm in parallel, such as simultaneously and/or substantially simultaneously performing a step two or more times using two or more parallel threads, processor 104 cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 14, machine learning processes may include at least an unsupervised machine-learning processes 1432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 1432 may not require a response variable; unsupervised processes 1432 may be used to find interesting patterns and/or inferences between variables, to determine a degree of correlation between two or more variables, or the like.

Still referring to FIG. 14, machine-learning module 1400 may be designed and configured to create a machine-learning model 1424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 14, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 14, a machine-learning model and/or process may be deployed or instantiated by incorporation into a program, apparatus 100, system and/or module. For instance, and without limitation, a machine-learning model, neural network, and/or some or all parameters thereof may be stored and/or deployed in any memory 108 or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory 108. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory 108, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory 108 elements, circuits, and/or modules such as without limitation non-rewritable ROM, production and/or configuration of reconfigurable and/or rewritable memory 108 elements, circuits, and/or modules such as without limitation rewritable ROM or other memory 108 technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 14, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field 160 testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 14, retraining and/or additional training may be performed using any process for training described above, using any currently or previously deployed version of a machine-learning model and/or algorithm as a starting point. Training data 156 for retraining may be collected, preconditioned, sorted, classified, sanitized or otherwise processed according to any process described in this disclosure. Training data 156 may include, without limitation, training examples including inputs and correlated outputs used, received, and/or generated from any version of any system, module, machine-learning model or algorithm, apparatus 100, and/or method described in this disclosure; such examples may be modified and/or labeled according to user feedback or other processes to indicate desired results, and/or may have actual or measured results from a process being modeled and/or predicted by system, module, machine-learning model or algorithm, apparatus 100, and/or method as "desired" results to be compared to outputs for training processes as described above.

Redeployment may be performed using any reconfiguring and/or rewriting of reconfigurable and/or rewritable circuit and/or memory 108 elements; alternatively, redeployment may be performed by production of new hardware and/or software components, circuits, instructions, or the like, which may be added to and/or may replace existing hardware and/or software components, circuits, instructions, or the like.

Further referring to FIG. 14, one or more processes or algorithms described above may be performed by at least a dedicated hardware unit 1436. A "dedicated hardware unit," for the purposes of this figure, is a hardware component, circuit, or the like, aside from a principal control circuit and/or processor 104 performing method steps as described in this disclosure, that is specifically designated or selected to perform one or more specific tasks and/or processes described in reference to this figure, such as without limitation preconditioning and/or sanitization of training data 156 and/or training a machine-learning algorithm and/or model. A dedicated hardware unit 1436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like;

such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 1436 may include, without limitation, graphical processing units (GPUs), dedicated signal processing modules, FPGA or other reconfigurable hardware that has been configured to instantiate parallel processing units for one or more specific tasks, or the like, A computing device, processor 104, apparatus 100, or module may be configured to instruct one or more dedicated hardware units 1436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Referring now to FIG. 13, an exemplary embodiment of neural network 1500 is illustrated. A neural network 1500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 1504, one or more intermediate layers 1508, and an output layer of nodes 1512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 16:
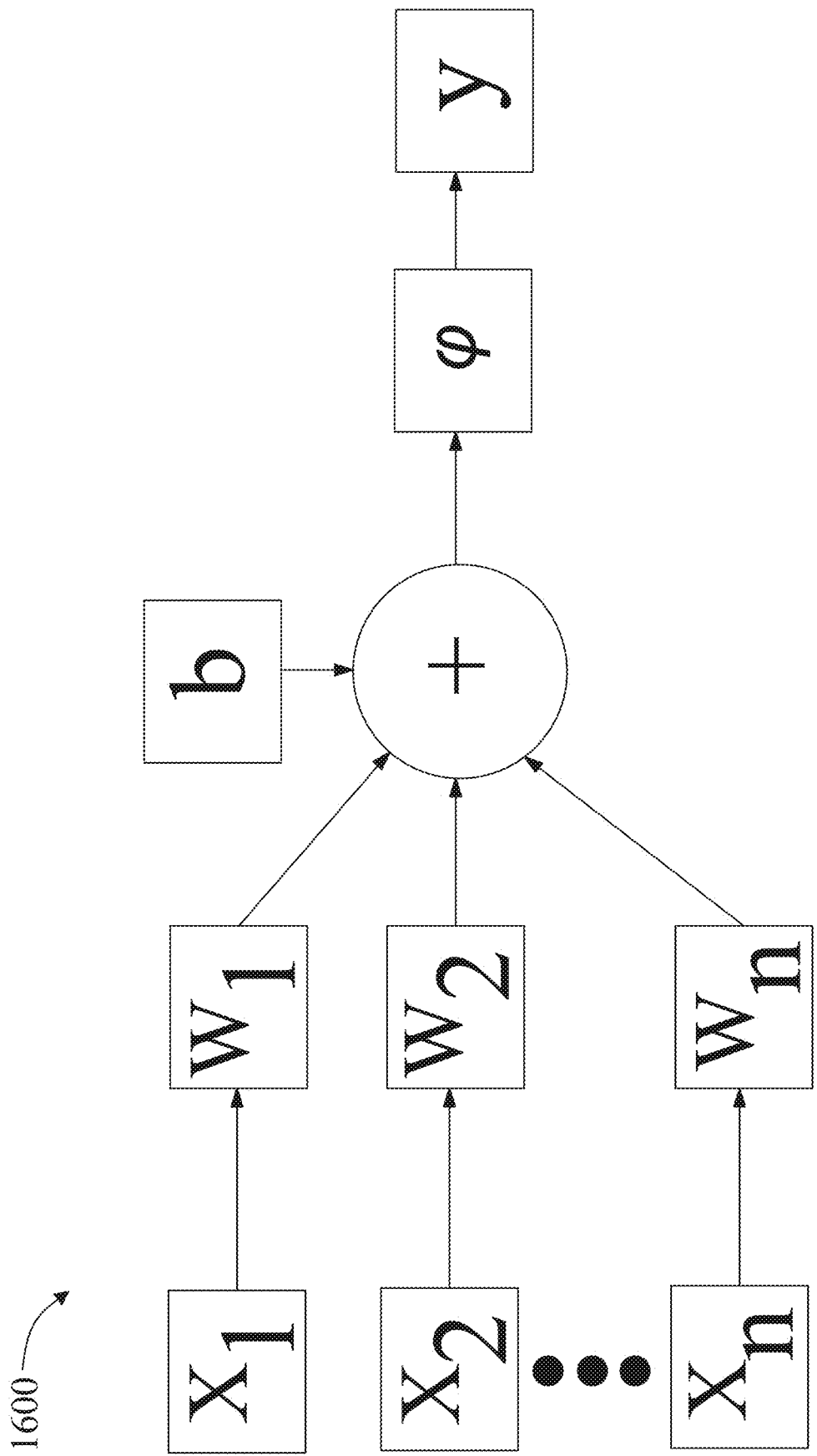
FIG. 16 is a diagram of an exemplary neural network node.

Referring now to FIG. 16, an exemplary embodiment of a node 1600 of a neural network is illustrated. A node may include, without limitation, a plurality of inputs xi that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x) = \tanh^2(x)$, a rectified linear unit function such as $f(x) = \max(0, x)$, a "leaky" and/or "parametric" rectified linear unit function such as $f(x) = \max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x) = x * \text{sigmoid}(x)$, a Gaussian error linear unit function such as $f(x) = a(1 + \tanh(\sqrt{2/\pi}(x + bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data 156, which may be performed using any suitable process as described above.

Still referring to FIG. 16, a "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like. CNN may include, without limitation, a deep neural network (DNN) extension, where a DNN is defined as a neural network with two or more hidden layers.

Still referring to FIG. 16, in some embodiments, a convolutional neural network may learn from images 136. In non-limiting examples, a convolutional neural network may perform tasks such as classifying images 136, detecting objects depicted in an image 136, segmenting an image 136, and/or processing an image 136. In some embodiments, a convolutional neural network may operate such that each node in an input layer is only connected to a region of nodes in a hidden layer. In some embodiments, the regions in aggregate may create a feature map from an input layer to the hidden layer. In some embodiments, a convolutional neural network may include a layer in which the weights and biases for all nodes are the same. In some embodiments, this may allow a convolutional neural network to detect a feature, such as an edge, across different locations in an image 136.

With continued reference to FIG. 1, in an embodiment, generative neural network may comprise a deep neural network (DNN). As used in this disclosure, a "deep neural network" is defined as a neural network with two or more hidden layers. In a non-limiting example, generative neural network may include a convolutional neural network (CNN). A "convolutional neural network," for the purpose of this disclosure, is a neural network in which at least one hidden layer is a convolutional layer that convolves inputs to that layer with a subset of inputs known as a "kernel," along with one or more additional layers such as pooling layers, fully connected layers, and the like. In some cases, CNN may include, without limitation, a deep neural network (DNN) extension. Mathematical (or convolution) operations performed in the convolutional layer may include convolution of two or more functions, where the kernel may be applied to input data e.g., inputs described above for generative neural network. through a sliding window approach. In some cases, convolution operations may enable processor 104 to detect local/global patterns, edges, textures, and any other features described herein within inputs described above for generative neural network. Spatial features may be passed through one or more activation functions, such as without limitation, Rectified Linear Unit (ReLU), to introduce non-linearities into processing steps. Additionally, or alternatively, CNN may also include one or more pooling layers, wherein each pooling layer is configured to reduce the dimensionality of input data while preserving essential features within the input data. In a non-limiting example, CNN may include one or more pooling layer configured to reduce the spatial dimensions of spatial feature maps by applying downsampling, such as max-pooling or average pooling, to small, non-overlapping regions of one or more features.

Still referring to FIG. 1, CNN may further include one or more fully connected layers configured to combine features extracted by the convolutional and pooling layers as described above. In some cases, one or more fully connected layers may allow for higher-level pattern recognition. In a non-limiting example, one or more fully connected layers may connect every neuron (i.e., node) in its input to every neuron in its output, functioning as a traditional feedforward neural network layer. In some cases, one or more fully connected layers may be used at the end of CNN to perform high-level reasoning and produce the final output. Further, each fully connected layer may be followed by one or more dropout layers configured to prevent overfitting, and one or more normalization layers to stabilize the learning process described herein.

With continued reference to FIG. 1, in an embodiment, training the generative neural network (i.e., CNN) may include selecting a suitable loss function to guide the training process. In a non-limiting example, a loss function that measures the difference between the predicted output and the ground truth 3D structure e.g., outputs may be used, such as, without limitation, mean squared error (MSE) or a custom loss function may be designed for one or more embodiments described herein. Additionally, or alternatively, optimization algorithms, such as stochastic gradient descent (SGD), may then be used to adjust the generative neural network's parameters to minimize such loss. In a further non-limiting embodiment, instead of directly predicting outputs, generative neural network may be trained as a regression model to predict outputs. Additionally, CNN may be extended with additional deep learning techniques, such as recurrent neural networks (RNNs) or attention mechanism, to capture additional features and/or data relationships within input data.

Figure 15:
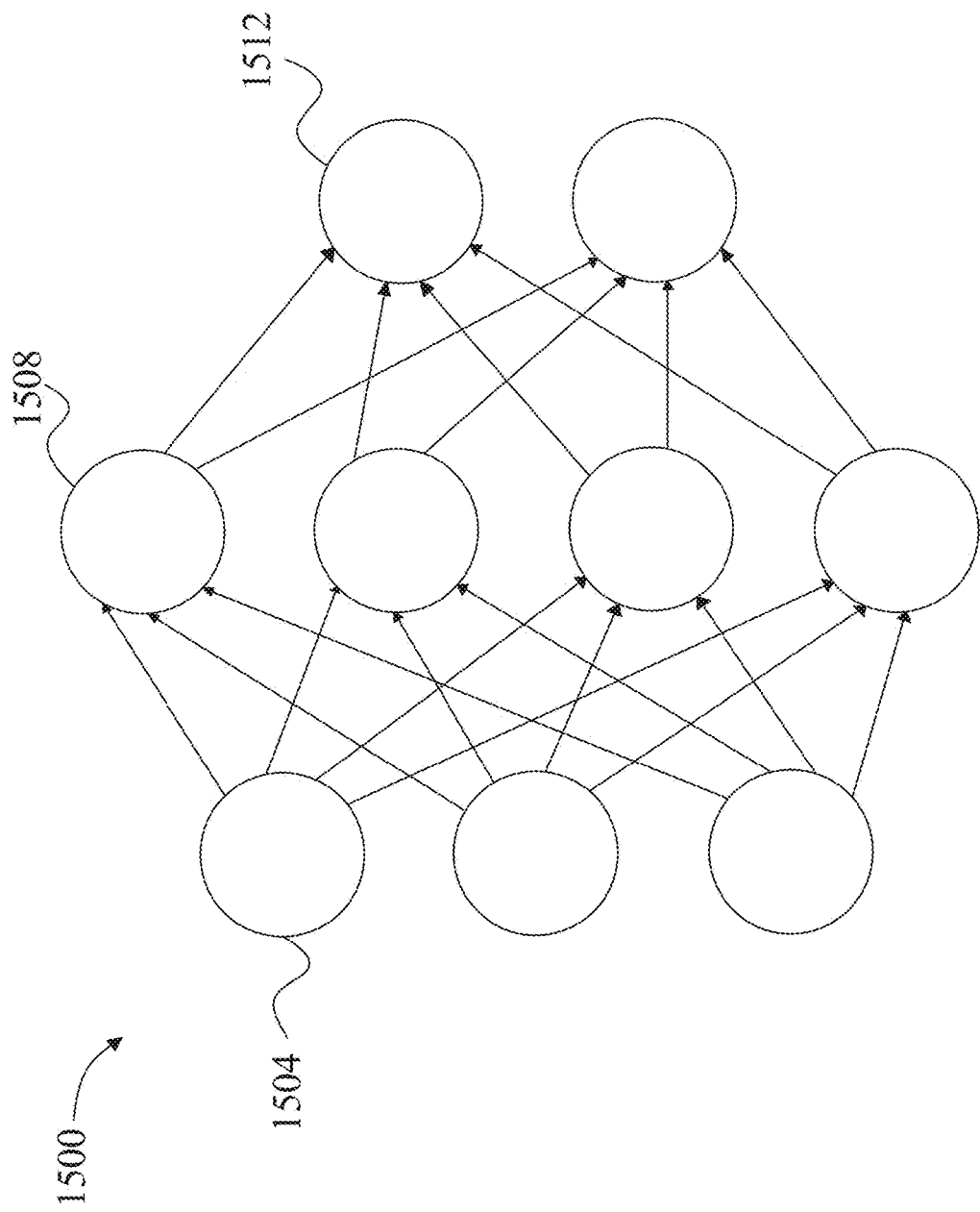
FIG. 15 is a diagram of an exemplary neural network.

Referring now to FIG. 15, machine learning process may include a generative machine learning process. As used in this disclosure, a "generative machine learning process" is a process that automatedly, using a prompt (i.e., input), generates an output consistent with training data; this is in contrast to a non-machine learning software program where outputs are determined in advance by a user and written in a programming language. In some embodiments, generative machine-learning processes may determine patterns and structures from training data and use these patterns and structures to synthesize new data with similar characteristics, as a function of an input. As a non-limiting example, generative machine-learning process may determine patterns and structures from training data of language processing models, and/or any other models in this disclosure.

With continued reference to FIG. 1 generative machine learning processes may synthesize data of different types or domains, including without limitation text, code, images 136, molecules, audio (e.g., music), video 140, and robot actions (e.g., electromechanical system actions). Exemplary generative machine learning systems trained on words or word tokens, operant in text domain, include GPT-3, LaMDA, LLaMA, BLOOM, GPT-4, and the like. Exemplary machine learning processes trained on programming language text (i.e., code) include without limitation OpenAI Codex. Exemplary machine learning processes trained on sets of images 136 (for instance with text captions) include Image 136n, DALL-E, Midjourney, Adobe Firefly, Stable Diffusion, and the like; image 136 generative machine learning processes, in some cases, may be trained for text-to-image generation and/or neural style transfer. Exemplary generative machine learning processes trained on molecular data include, without limitation, AlphaFold, which may be used for protein structure prediction and drug discovery. Generative machine learning processes trained on audio training data include MusicLM which may be trained on audio waveforms of music correlated with text annotations; music generative machine learning processes, in some cases, may generate new musical samples based on text descriptions. Exemplary generative machine learning processes trained on video 140 include without limitation RunwayML and Make-A-Video 140 by Meta Platforms. Finally, exemplary generative machine learning processes trained using robotic action data include without limitation UniPi from Google Research.

With continued reference to FIG. 1, in some cases a generative machine learning process may include a generative adversarial network (GAN). As used in this disclosure, a "generative adversarial network" is a machine learning process that includes at least two adverse networks configured to synthesize data according to prescribed rules (e.g., rules of a game). In some cases, a generative adversarial network may include a generative and a discriminative network, where the generative network generates candidate data and the discriminative network evaluates the candidate data. An exemplary GAN may be described according to a following game: Each probability space $(\Omega, \mu_{ref})$ defines a GAN game. There are two adverse networks: a generator network and a discriminator network. Generator network strategy set is $P(\Omega)$, the set of all probability measures $\mu_G$ on $\Omega$. Discriminator network strategy set is the set of Markov kernels $\mu_D:\Omega \rightarrow P[0,1]$, where $P[0,1]$ is set of probability measures on $[0,1]$. GAN game may be a zero-sum game, with objective function:

$$L(\mu_G, \mu_D) := \mathbb{E}_{x \sim \mu_{ref}, y \sim \mu_D(x)}[\ln y] + \mathbb{E}_{x \sim \mu_G, y \sim \mu_D(x)}[\ln(1-y)].$$

Generally, generator network may aim to minimize objective, and discriminator network may aim to maximize the objective. Specifically, generator network seeks to approach $\mu_G \approx \mu_{ref}$, said another way, generator network produces candidate data that matches its own output distribution as closely as possible to a reference distribution (provided with training data). Discriminator network outputs a value close to 1 when candidate data appears to be from reference (training data) distribution, and to output a value close to 0 when candidate data looks like it came from generator network distribution. Generally speaking, generative network generates candidates while discriminative network evaluates them, with contest operating in terms of data distributions. In some embodiments, generator network may learn to map from a latent space to a data distribution of interest, while discriminator network may distinguish candidates produced by the generator network from a true data distribution (e.g., training data). In some cases, generator network's training objective is to increase an error rate of discriminator network (i.e., "fool" the discriminator network by producing novel candidates that the discriminator thinks are not synthesized but, instead, are part of training data). In some cases, a known dataset may serve as initial training data for discriminator network. Training may involve presenting discriminator network with samples from training dataset until it achieves acceptable accuracy. In some cases, generator network may be trained on whether the generator network succeeds in fooling discriminator network. A generator network may be seeded with randomized input that is sampled from a predefined latent space (e.g. a multivariate normal distribution). Thereafter, candidates synthesized by generator network may be evaluated by discriminator network. Independent backpropagation procedures may be applied to both networks so that generator network may produce better samples, while discriminator network may become more skilled at flagging synthetic samples. When used for image generation, generator network may be a deconvolutional neural network, and discriminator may be a convolutional neural network.

Still referring to FIG. 14, a neural network such as generative neural network may include a large language model (LLM). A "large language model," as used herein, is a deep learning data structure that can recognize, summarize, translate, predict and/or generate text and other content based on knowledge gained from massive datasets. Large language models may be trained on large sets of data. Training sets may be drawn from diverse sets of data such as, as non-limiting examples, novels, blog posts, articles, emails, unstructured data, electronic records, and the like. In some embodiments, training sets may include a variety of subject matters, such as, as nonlimiting examples, medical report documents, electronic health records, entity documents, business documents, inventory documentation, emails, user communications, advertising documents, newspaper articles, and the like. In some embodiments, training sets of an LLM may include information from one or more public or private databases. As a non-limiting example, training sets may include databases associated with an entity. In some embodiments, training sets may include portions of documents associated with the electronic records correlated to examples of outputs. In an embodiment, an LLM may include one or more architectures based on capability requirements of an LLM. Exemplary architectures may include, without limitation, GPT (Generative Pretrained Transformer), BERT (Bidirectional Encoder Representations from Transformers), T5 (Text-To-Text Transfer Transformer), and the like. Architecture choice may depend on a needed capability such generative, contextual, or other specific capabilities.

With continued reference to FIG. 14, in some embodiments, an LLM may be generally trained. As used in this disclosure, a "generally trained" LLM is an LLM that is trained on a general training set comprising a variety of subject matters, data sets, and fields. In some embodiments, an LLM may be initially generally trained. Additionally, or alternatively, an LLM may be specifically trained. As used in this disclosure, a "specifically trained" LLM is an LLM that is trained on a specific training set, wherein the specific training set includes data including specific correlations for the LLM to learn. As a non-limiting example, an LLM may be generally trained on a general training set, then specifically trained on a specific training set. In an embodiment, specific training of an LLM may be performed using a supervised machine learning process. In some embodiments, generally training an LLM may be performed using an unsupervised machine learning process. As a non-limiting example, specific training set may include information from a database. As a non-limiting example, specific training set may include text related to the users such as user specific data for electronic records correlated to examples of outputs. In an embodiment, training one or more machine learning models may include setting the parameters of the one or more models (weights and biases) either randomly or using a pretrained model. Generally training one or more machine learning models on a large corpus of text data can provide a starting point for fine-tuning on a specific task. A model such as an LLM may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In some cases, this may include optimizing the model's performance by fine-tuning hyperparameters such as learning rate, batch size, and regularization. Hyperparameter tuning may help in achieving the best performance and convergence during training. In an embodiment, fine-tuning a pretrained model such as an LLM may include fine-tuning the pretrained model using Low-Rank Adaptation (LoRA). As used in this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 14, in some embodiments an LLM may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. An LLM may include a text prediction based algorithm configured to receive an article and apply a probability distribution to the words already typed in a sentence to work out the most likely word to come next in augmented articles. For example, if some words that have already been typed are "Nice to meet", then it may be highly likely that the word "you" will come next. An LLM may output such predictions by ranking words by likelihood or a prompt parameter. For the example given above, an LLM may score "you" as the most likely, "your" as the next most likely, "his" or "her" next, and the like. An LLM may include an encoder component and a decoder component.

Still referring to FIG. 14, an LLM may include a transformer architecture. In some embodiments, encoder component of an LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 14, an LLM and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 14, attention mechanism may represent an improvement over a limitation of an encoder-decoder model. An encoder-decider model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, an LLM may predict the next word by searching for a set of positions in a source sentence where the most relevant information is concentrated. An LLM may then predict the next word based on context vectors associated with these source positions and all the previously generated target words, such as textual data 132 of a dictionary correlated to a prompt in a training data set. A "context vector," as used herein, are fixed-length vector representations useful for document retrieval and word sense disambiguation.

Still referring to FIG. 14, attention mechanism may include, without limitation, generalized attention self-attention, multi-head attention, additive attention, global attention, and the like. In generalized attention, when a sequence of words or an image 136 is fed to an LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image 136 that it needs to pay attention to. In self-attention, an LLM may pick up particular parts at different positions in the input sequence and over time compute an initial composition of the output sequence. In multi-head attention, an LLM may include a transformer model of an attention mechanism. Attention mechanisms, as described above, may provide context for any position in the input sequence. For example, if the input data is a natural language sentence, the transformer does not have to process one word at a time. In multi-head attention, computations by an LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), an LLM may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, an LLM may either attend to all source words or predict the target sentence, thereby attending to a smaller subset of words.

With continued reference to FIG. 14, multi-headed attention in encoder may apply a specific attention mechanism called self-attention. Self-attention allows models such as an LLM or components thereof to associate each word in the input, to other words. As a non-limiting example, an LLM may learn to associate the word "you", with "how" and "are". It's also possible that an LLM learns that words structured in this pattern are typically a question and to respond appropriately. In some embodiments, to achieve self-attention, input may be fed into three distinct fully connected neural network layers to create query, key, and value vectors. A query vector may include an entity's learned representation for comparison to determine attention score. A key vector may include an entity's learned representation for determining the entity's relevance and attention weight. A value vector may include data used to generate output representations. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

Still referencing FIG. 14, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 14, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

Continuing to refer to FIG. 14, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With further reference to FIG. 14, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 14, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens".

Still referring to FIG. 14, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 14, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

Still referring to FIG. 14, decoder may take this output and add it to the decoder inputs. Decoder may continue decoding until a token is predicted. Decoder may stop decoding once it predicts an end token.

Continuing to refer to FIG. 14, in some embodiment, decoder may be stacked N layers high, with each layer taking in inputs from the encoder and layers before it. Stacking layers may allow an LLM to learn to extract and focus on different combinations of attention from its attention heads.

With continued reference to FIG. 14, an LLM may receive an input. Input may include a string of one or more characters. Inputs may additionally include unstructured data. For example, input may include one or more words, a sentence, a paragraph, a thought, a query, and the like. A "query" for the purposes of the disclosure is a string of characters that poses a question. In some embodiments, input may be received from a user device. User device may be any computing device that is used by a user. As non-limiting examples, user device may include desktops, laptops, smartphones, tablets, and the like.

With continued reference to FIG. 1, an LLM may generate at least one annotation as an output. At least one annotation may be any annotation as described herein. In some embodiments, an LLM may include multiple sets of transformer architecture as described above. Output may include a textual output. A "textual output," for the purposes of this disclosure is an output comprising a string of one or more characters. Textual output may include, for example, a plurality of annotations for unstructured data. In some embodiments, textual output may include a phrase or sentence identifying the status of a user query. In some embodiments, textual output may include a sentence or plurality of sentences describing a response to a user query. As a non-limiting example, this may include restrictions, timing, advice, dangers, benefits, and the like.

Figure 17:
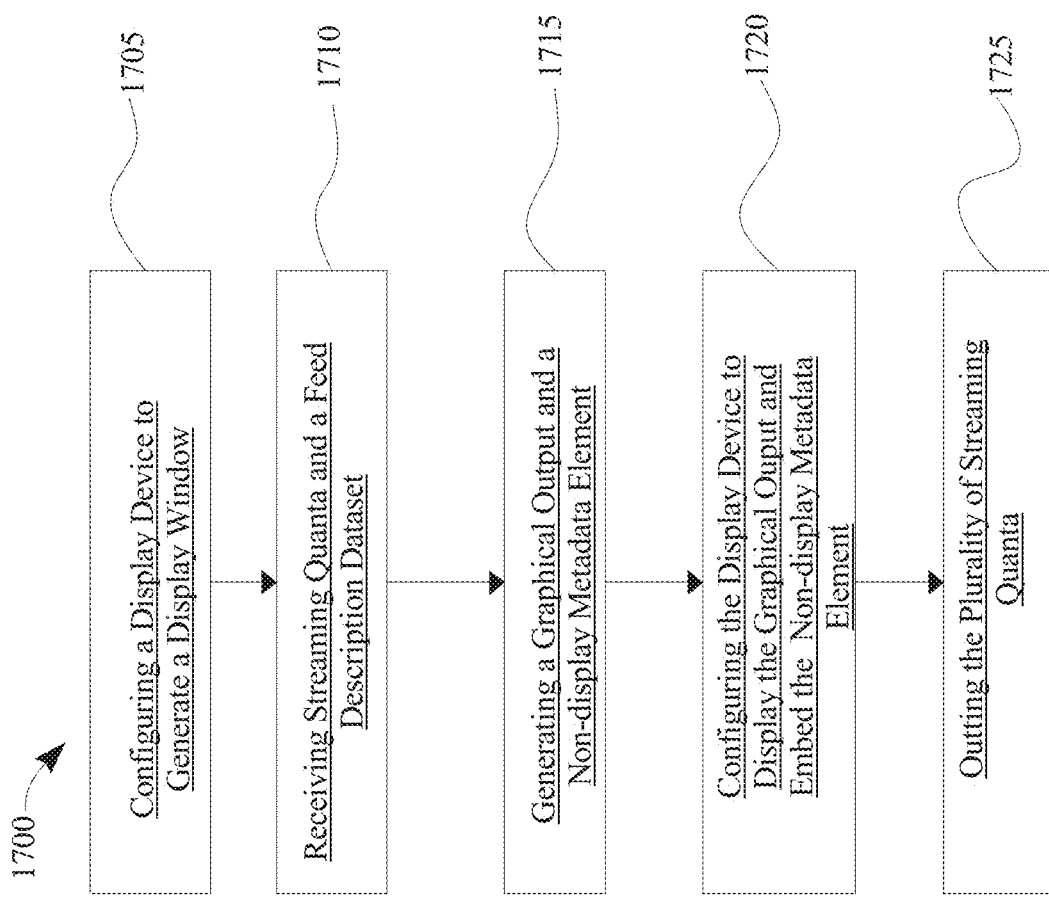
FIG. 17 is a flow diagram of an exemplary embodiment of a method of generating a dynamically self-modifying graphical interface.

Referring now to FIG. 17, an exemplary embodiment of a method 1700 of generating a dynamically self-modifying graphical interface is illustrated. At step 1705, at least a processor 104 configures a display device 112 to generate a display window 116; this may be implemented without limitation as described above in reference to FIGS. 1-16

Still referring to FIG. 17, at step 1710, at least a processor 104 receives a plurality of streaming quanta 120 and/or feed content data and a feed description dataset 124 associated with the plurality of streaming quanta 120 and/or feed content data; this may be implemented without limitation as described above in reference to FIGS. 1-16.

Continuing to refer to FIG. 17, at step 1715, at least a processor 104 generates a graphical output element 128 and a non-display metadata element 148 as a function of feed description dataset 124, wherein generating the graphical output element 128 and the non-display metadata element 148 further comprises generating the graphical output element 128 and the non-display metadata element 148 using the feed description dataset 124 and a generative neural network 152 trained to input feed description dataset 124 and output graphical elements and non-display metadata elements 148; this may be implemented without limitation as described above in reference to FIGS. 1-16. For instance, generative neural network 152 may be multimodal. In an embodiment, graphical output element 128 may include textual data 132; textual data 132 may include a feed summary. Graphical output element 128 may include an image 136. Graphical output element 128 may include a video 140. Graphical output element 128 may include a slide show 144. In a non-limiting example, generating the graphical output element 128 may include extracting at least a data element from the streaming quanta 120 and/or feed content data, inputting the at least a data element to the generative neural network 152, and generating the graphical output element 128 using the at least a data element, the feed description dataset 124, and the generative neural network 152.

Still referring to FIG. 17, at step 1720, at least a processor 104 configures display device 112 to display, in a field of display window 116, graphical output element 128, embed, in the display window 116, non-display metadata element 148, and output plurality of streaming quanta 120 and/or feed content data; this may be implemented without limitation as described above in reference to FIGS. 1-16. In some embodiments, display window 116 may further include a display bar 164, and processor 104 may configure display device 112 to output streaming quanta 120 and/or feed content data at the display bar 164. In some embodiments, field may include a previous graphical output element 168, and at least a processor 104 may configure display device 112 to modify the previous graphical output element 168.

Figure 18:
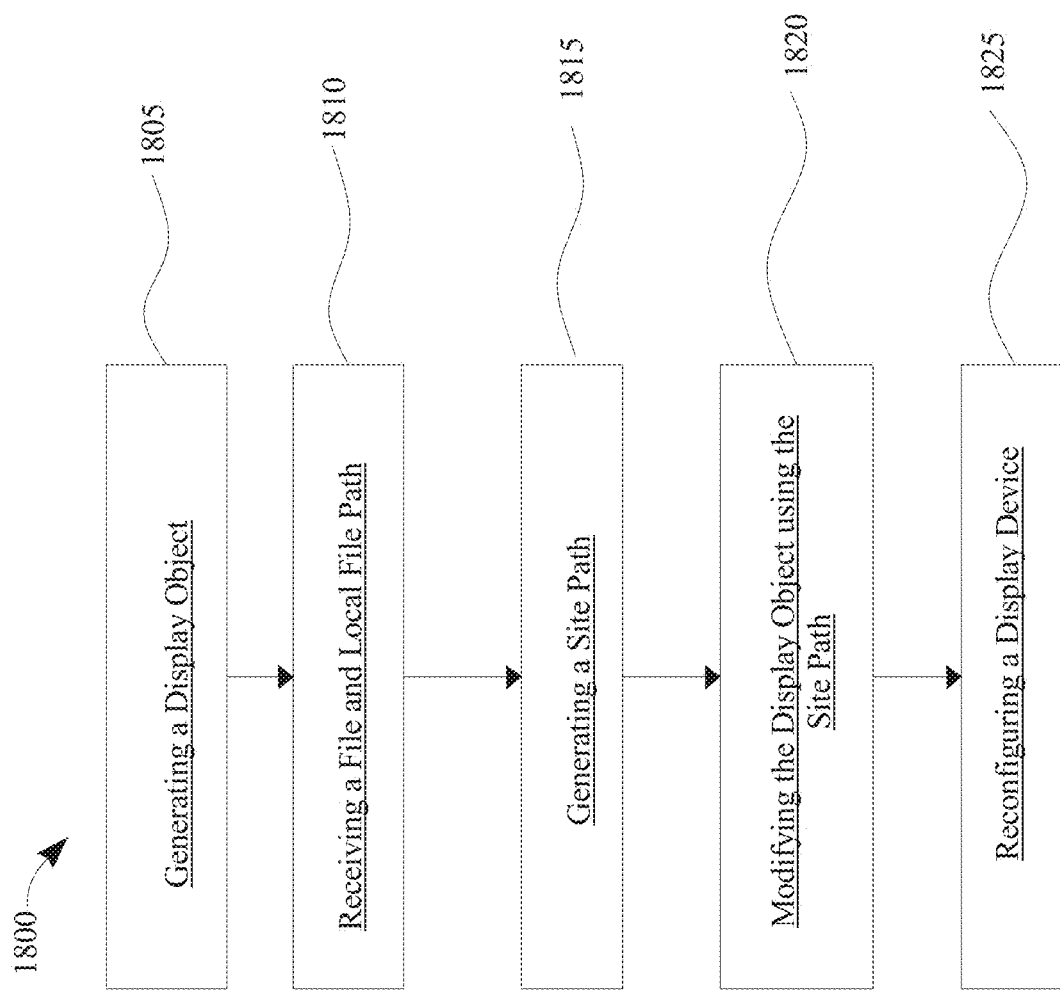
FIG. 18 is a flow diagram of an exemplary embodiment of a method of generating a dynamically modifiable graphical interface.

Referring now to FIG. 18, an exemplary embodiment of a method 1800 of generating a dynamically modifiable graphical interface is illustrated. At step 1805, at least a processor 104 generates a display object that configures a display device 112 to generate a display window 116, the display window 116 having file addition event handler, the event handler configuring the display device 112 to receive a user command to add a file to the display window 116, determine a local file path for the file, modify the display window 116 display the file in the display window 116 using the local file path, and transmit the file and the local file path to the apparatus 100; this may be implemented, without limitation, as described above in reference to FIGS. 1-16.

At step 1810, and still referring to FIG. 18, at least a processor 104 receives file and local file path from display device 112; this may be implemented, without limitation, as described above in reference to FIGS. 1-16.

Continuing to refer to FIG. 18, at step 1815 at least a processor 104 generates a site path for the file based on the local file path; this may be implemented, without limitation, as described above in reference to FIGS. 1-16.

Still referring to FIG. 18, at step 1820, at least a processor 104 modifies display object to configure remote devices to display modified display window 116 displaying the file using the site path; this may be implemented, without limitation, as described above in reference to FIGS. 1-16.

Continuing to refer to FIG. 18, at step 1825 at least a processor 104 reconfigures display device 112 using modified display object; this may be implemented, without limitation, as described above in reference to FIGS. 1-16.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 19:
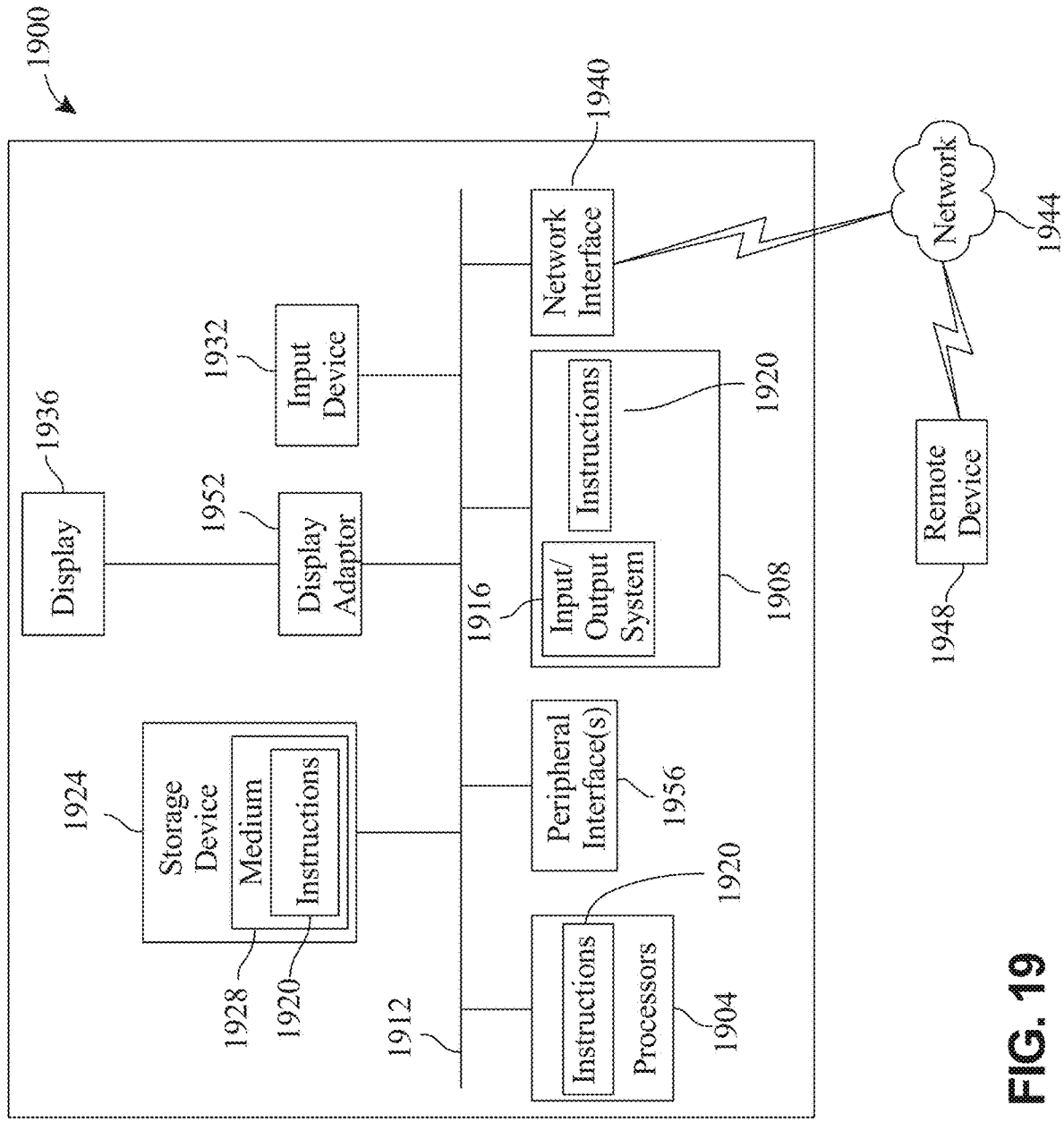
FIG. 19 is a block diagram of a computing system that can be used to implement any one or more of the methodologies disclosed herein and any one or more portions thereof.

FIG. 19 shows a diagrammatic representation of one embodiment of a computing device in the exemplary form of a computer system 1900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1900 includes a processor 104 1904 and a memory 1908 that communicate with each other, and with other components, via a bus 1912. Bus 1912 may include any of several types of bus structures including, but not limited to, a memory bus, a memory controller, a peripheral bus, a local bus, and any combinations thereof, using any of a variety of bus architectures.

Processor 104 1904 may include any suitable processor 104, such as without limitation a processor 104 incorporating logical circuitry for performing arithmetic and logical operations, such as an arithmetic and logic unit (ALU), which may be regulated with a state machine and directed by operational inputs from memory and/or sensors; processor 104 1904 may be organized according to Von Neumann and/or Harvard architecture as a non-limiting example. Processor 104 1904 may include, incorporate, and/or be incorporated in, without limitation, a microcontroller, microprocessor 104, digital signal processor 104 (DSP), Field Programmable Gate Array (FPGA), Complex Programmable Logic Device (CPLD), Graphical Processing Unit (GPU), general purpose GPU, Tensor Processing Unit (TPU), analog or mixed signal processor 104, Trusted Platform Module (TPM), a floating point unit (FPU), and/or system on a chip (SoC).

Memory 1908 may include various components (e.g., machine-readable media) including, but not limited to, a random-access memory component, a read only component, and any combinations thereof. In one example, a basic input/output system 1916 (BIOS), including basic routines that help to transfer information between elements within computer system 1900, such as during start-up, may be stored in memory 1908. Memory 1908 may also include (e.g., stored on one or more machine-readable media) instructions (e.g., software) 1920 embodying any one or more of the aspects and/or methodologies of the present disclosure. In another example, memory 1908 may further include any number of program modules including, but not limited to, an operating system, one or more application programs, other program modules, program data, and any combinations thereof.

Computer system 1900 may also include a storage device 1924. Examples of a storage device (e.g., storage device 1924) include, but are not limited to, a hard disk drive, a magnetic disk drive, an optical disc drive in combination with an optical medium, a solid-state memory device, and any combinations thereof. Storage device 1924 may be connected to bus 1912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1924 (or one or more components thereof) may be removably interfaced with computer system 1900 (e.g., via an external port connector (not shown)). Particularly, storage device 1924 and an associated machine-readable medium 1928 may provide nonvolatile and/or volatile storage of machine-readable instructions, data structures, program modules, and/or other data for computer system 1900. In one example, software 1920 may reside, completely or partially, within machine-readable medium 1928. In another example, software 1920 may reside, completely or partially, within processor 104 1904.

Computer system 1900 may also include an input device 1932. In one example, a user of computer system 1900 may enter commands and/or other information into computer system 1900 via input device 1932. Examples of an input device 1932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1932 may be interfaced to bus 1912 via any of a variety of interfaces (not shown) including, but not limited to, a serial interface, a parallel interface, a game port, a USB interface, a FIREWIRE interface, a direct interface to bus 1912, and any combinations thereof. Input device 1932 may include a touch screen interface that may be a part of or separate from display 1936, discussed further below. Input device 1932 may be utilized as a user selection device for selecting one or more graphical representations in a graphical interface as described above.

A user may also input commands and/or other information to computer system 1900 via storage device 1924 (e.g., a removable disk drive, a flash drive, etc.) and/or network interface device 1940. A network interface device, such as network interface device 1940, may be utilized for connecting computer system 1900 to one or more of a variety of networks, such as network 1944, and one or more remote devices 1948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1944, may employ a wired and/or a wireless mode of communication. In general, any network topology may be used. Information (e.g., data, software 1920, etc.) may be communicated to and/or from computer system 1900 via network interface device 1940.

Computer system 1900 may further include a video display adapter 1952 for communicating a displayable image to a display device, such as display device 1936. Examples of a display device include, but are not limited to, a liquid crystal display (LCD), a cathode ray tube (CRT), a plasma display, a light emitting diode (LED) display, and any combinations thereof. Display adapter 1952 and display device 1936 may be utilized in combination with processor 104 1904 to provide graphical representations of aspects of the present disclosure. In addition to a display device, computer system 1900 may include one or more other peripheral output devices including, but not limited to, an audio speaker, a printer, and any combinations thereof. Such peripheral output devices may be connected to bus 1912 via a peripheral interface 1956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating a dynamically self-modifying graphical interface, the apparatus comprising:
    at least a processor; and
    a memory communicatively connected to the at least a processor, the memory containing instructions configuring the at least a processor to:
        configure a display device to generate a display window;
        receive a plurality of streaming quanta and a feed description dataset associated with the plurality of streaming quanta;
        generate a graphical output element and a non-display metadata element as a function of the feed description dataset, wherein generating the graphical output element and the non-display metadata element further comprises generating the graphical output element and the non-display metadata element using the feed description dataset and a generative neural network, wherein:
            the generative neural network is trained to receive feed description datasets as inputs and to generate graphical output elements and non-display metadata elements as outputs;
            the outputs from the generative neural network are fed into a search engine optimization (SEO) emulator to generate an error function output; and
            the generative neural network is corrected and/or retrained as a function of the error function output; and
        configure the display device to:
            display, in a field of the display window, the graphical output element;
            embed, in the display window, the non-display metadata element; and
            output the plurality of streaming quanta.

2. The apparatus of claim 1, wherein the generative neural network is multimodal.

3. The apparatus of claim 1, wherein the graphical output element includes textual data.

4. The apparatus of claim 3, wherein the textual data includes a feed summary.

5. The apparatus of claim 1, wherein the graphical output element includes an image.

6. The apparatus of claim 1, wherein the graphical output element includes a video.

7. The apparatus of claim 1, wherein the graphical output element includes a slide show.

8. The apparatus of claim 1, wherein generating the graphical output element further comprises:
    extracting at least a data element from the plurality of streaming quanta;
    inputting the at least a data element to the generative neural network; and
    generating the graphical output element using the at least a data element, the feed description dataset, and the generative neural network.

9. The apparatus of claim 1, wherein:
    the display window further comprises a display bar; and
    the apparatus configures the display device to output the plurality of streaming quanta at the display bar.

10. The apparatus of claim 1, wherein the field includes a previous graphical output element, and the apparatus configures the display device to modify the previous graphical output element.

11. A method of generating a dynamically self-modifying graphical interface, the method comprising:
    configuring, by at least a processor, a display device to generate a display window;
    receiving, by the at least a processor, a plurality of streaming quanta and a feed description dataset associated with the plurality of streaming quanta;
    generating, by the at least a processor, a graphical output element and a non-display metadata element as a function of the feed description dataset, wherein generating the graphical output element and the non-display metadata element further comprises generating the graphical output element and the non-display metadata element using the feed description dataset and a generative neural network, wherein:
        the generative neural network is trained to receive feed description datasets as inputs and to generate graphical output elements and non-display metadata elements as outputs;
        the outputs from the generative neural network are fed into a search engine optimization (SEO) emulator to generate an error function output; and
        the generative neural network is corrected and/or retrained as a function of the error function output; and
    configuring, by the at least a processor, the display device to:
        display, in a field of the display window, the graphical output element;
        embed, in the display window, the non-display metadata element; and
        output the plurality of streaming quanta.

12. The method of claim 11, wherein the generative neural network is multimodal.

13. The method of claim 11, wherein the graphical output element includes textual data.

14. The method of claim 13, wherein the textual data includes a feed summary.

15. The method of claim 11, wherein the graphical output element includes an image.

16. The method of claim 11, wherein the graphical output element includes a video.

17. The method of claim 11, wherein the graphical output element includes a slide show.

18. The method of claim 11, wherein generating the graphical output element further comprises:
    extracting at least a data element from the plurality of streaming quanta;
    inputting the at least a data element to the generative neural network; and
    generating the graphical output element using the at least a data element, the feed description dataset, and the generative neural network.

19. The method of claim 11, wherein the display window further comprises a display bar, and further comprising configuring the display device to output the plurality of streaming quanta at the display bar.

20. The method of claim 11, wherein the field includes a previous graphical output element, and further comprising configuring the display device to modify the previous graphical output element.

* * * * *